United States Patent
Kasugai et al.

(10) Patent No.: US 12,238,432 B2
(45) Date of Patent: Feb. 25, 2025

(54) APPARATUS, SYSTEM, MOVING BODY, AND EQUIPMENT

(71) Applicant: CANON KABUSHIKI KAISHA, Tokyo (JP)

(72) Inventors: Taichi Kasugai, Kanagawa (JP); Yasuharu Ota, Tokyo (JP); Shintaro Takenaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 88 days.

(21) Appl. No.: 18/047,223

(22) Filed: Oct. 17, 2022

(65) Prior Publication Data

US 2023/0119511 A1 Apr. 20, 2023

(30) Foreign Application Priority Data

Oct. 20, 2021 (JP) ................. 2021-171692

(51) Int. Cl.
*H04N 25/42* (2023.01)
*H04N 25/71* (2023.01)
*H04N 25/75* (2023.01)

(52) U.S. Cl.
CPC ........... *H04N 25/42* (2023.01); *H04N 25/745* (2023.01); *H04N 25/75* (2023.01)

(58) Field of Classification Search
CPC ...... H04N 25/42; H04N 25/745; H04N 25/75; H04N 25/773; H04N 25/779; H04N 25/7795

See application file for complete search history.

(56) References Cited

U.S. PATENT DOCUMENTS

| 2019/0305030 A1* | 10/2019 | Maehashi | H04N 25/57 |
| 2020/0244909 A1* | 7/2020 | Morimoto | H04N 25/773 |
| 2020/0252534 A1* | 8/2020 | Yasuda | H04N 23/73 |
| 2021/0302551 A1* | 9/2021 | Kubota | G01S 7/487 |

FOREIGN PATENT DOCUMENTS

JP 2020123847 A 8/2020

* cited by examiner

*Primary Examiner* — Nhan T Tran
(74) *Attorney, Agent, or Firm* — Canon U.S.A., Inc. IP Division

(57) ABSTRACT

An apparatus includes a pixel unit including a plurality of pixels arranged in a plurality of rows and each including a quench element of which a control node a signal defining a start and an end of an exposure period is input to and a photodiode connected to the quench element, a scan unit that scans the pixel unit by performing processing of reading signals of the pixels, processing of starting the exposure period, and processing of ending the exposure period on the plurality of rows sequentially in units of one row or two or more rows, and a control unit that outputs a synchronization signal to the scan unit to control a timing of the reading processing, wherein at least one of a timing of the start processing and a timing of the end processing is controlled by another control signal different from the synchronization signal.

19 Claims, 29 Drawing Sheets

APPARATUS, SYSTEM, MOVING BODY, AND EQUIPMENT

BACKGROUND

Technical Field

The aspect of the embodiments relates to a photoelectric conversion apparatus, a photoelectric conversion system, a moving body, and equipment.

Description of the Related Art

There are known photoelectric conversion apparatuses that include a pixel array in which a plurality of pixels each including an avalanche photodiode (APD) is arranged. In p-n junction regions of the APDs, charges generated by incident light cause avalanche multiplication.

Japanese Patent Application Laid-Open No. 2020-123847 discusses an apparatus that includes an APD, a quench circuit connected to the APD, a quench circuit having a gate to which pulse signals are input, and a pulse generation circuit that generates the pulse signals. The pulse generation circuit performs on/off control of the quench circuits. Exposure periods of the APDs are controlled by the pulse signals.

SUMMARY

According to an aspect of the embodiments, an apparatus includes a pixel unit including a plurality of pixels arranged in a plurality of rows and each including a quench element of which a control node a signal defining a start and an end of an exposure period is input to and a photodiode connected to the quench element, a scan unit that scans the pixel unit by performing processing of reading signals of the pixels, processing of starting the exposure period, and processing of ending the exposure period on the plurality of rows sequentially row by row in units of one row or two or more rows, and a control unit that outputs a synchronization signal to the scan unit to control a timing of the reading processing, wherein at least one of a timing of the start processing and a timing of the end processing is controlled by another control signal different from the synchronization signal.

Further features of the disclosure will become apparent from the following description of exemplary embodiments with reference to the attached drawings.

DESCRIPTION OF THE EMBODIMENTS

Various exemplary embodiments will be described below with reference to the drawings.

Mainly image capturing apparatuses as an example of photoelectric conversion apparatuses will be described in the following exemplary embodiments. It should be noted that the exemplary embodiments are not limited to the image capturing apparatuses and are also applicable to other examples of photoelectric conversion apparatuses. The examples include distance measurement apparatuses (apparatuses that measure distances using focus detection or time-of-flight (TOF)) and light measurement apparatuses (apparatuses that measure amounts of incident light).

The conductivity types of transistors described below in the exemplary embodiments are mere examples, and the conductivity types are not limited to those described in the exemplary embodiments below. Each conductivity type of the transistors described below in the exemplary embodiments can be changed as needed, and with the change of the conductivity type, the gate, source, and drain potentials of the transistor are changed.

For example, in a case where a conductivity type of a transistor that operates as a switch is changed, with the change of the conductivity type of the transistor, the low and high levels of a potential supplied to a gate of the transistor can be reversed with respect to those described in the exemplary embodiments. Further, conductivity types of semiconductor regions described below in the exemplary embodiments are mere examples, and the conductivity types of semiconductor regions are not limited to those described in the exemplary embodiments below. Each conductivity type described below in the exemplary embodiments can be changed as needed, and when a conductivity type of a semiconductor region is changed, a potential of the semiconductor region is changed. For example, while a case where a quench element 12 connected to an avalanche diode is a p-type metal oxide semiconductor (PMOS) transistor according to an exemplary embodiment is described below, the quench element 12 can be changed to an n-type metal oxide semiconductor (NMOS) transistor. In this case, the high and low levels of signals that are supplied to a gate are changed.

[Overall Description of Photoelectric Conversion Apparatus 100]

Figure 1:
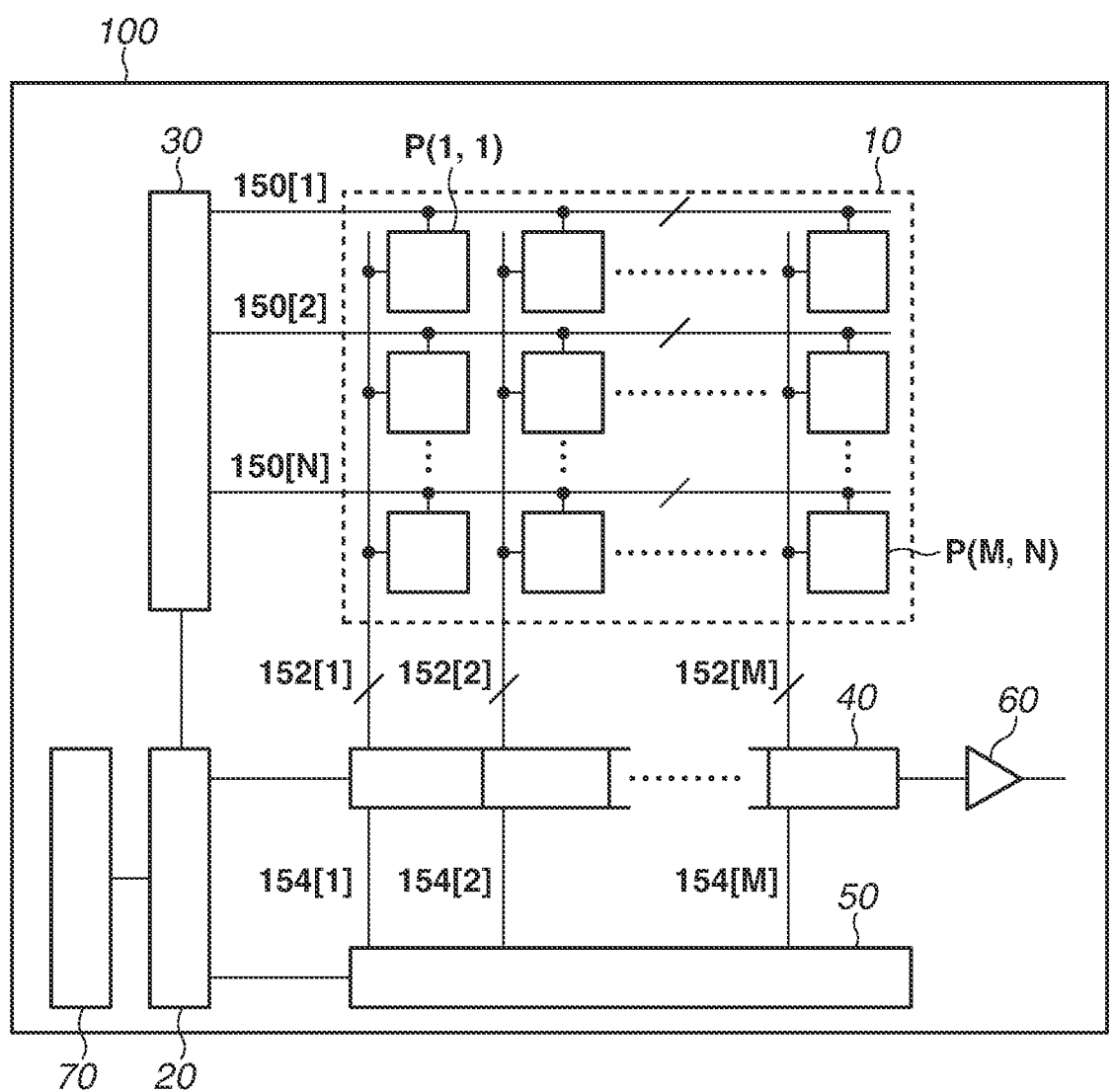
FIG. 1 is a diagram illustrating a configuration of a photoelectric conversion apparatus.

FIG. 1 is a block diagram illustrating a schematic configuration of a photoelectric conversion apparatus according to a first exemplary embodiment. As illustrated in FIG. 1, a photoelectric conversion apparatus 100 according to the present exemplary embodiment includes a pixel unit 10, a control unit 20, a vertical scan unit 30 (scan unit), signal processing units 40, a horizontal scan unit 50 (second scan unit), and an output unit 60.

The pixel unit 10 includes a plurality of pixels P arranged in a plurality of rows and a plurality of columns. In FIG. 1, the pixels P arranged in N rows from the first to Nth rows and M columns from the first to Mth columns are illustrated, each with a reference numeral indicating the row number and the column number. For example, the pixel P in the first row and in the first column is given the reference numeral "P(1, 1)".

The pixels P of the pixel unit 10 do not necessarily need to be arranged in a plurality of columns. For example, the pixels P can be arranged in a single column and a plurality of rows.

In each row of a pixel array of the pixel unit 10, a control line group 150 is arranged along a first direction (transverse direction in FIG. 1). Each control line group 150 is connected to the pixels P arranged along the first direction and is commonly connected to pixels P of a plurality of columns in the corresponding row. Each control line group 150 includes a plurality of control lines for controlling the pixels P of the corresponding row. The plurality of control lines transmits signals pCLK, pRES, and pVSEL, which will be described below, from the vertical scan unit 30 to the pixels P of the corresponding row. The vertical scan unit 30 selects a row or rows of the pixels P of the pixel unit 10 sequentially row by row in units of one row or two or more rows. This is how the vertical scan unit 30 performs a row scan (vertical scan) on the pixel unit 10. The term "units" as used herein refers to one pixel row that is selected during an overlapping period by the vertical scan unit 30 or two or more pixel rows that are selected during an overlapping period by the vertical scan unit 30 collectively as a single group.

The first direction along which the control line groups 150 extend is also referred to as "row direction" or "horizontal direction". In FIG. 1, the control line groups 150 are illustrated with reference numerals indicating row numbers. For example, the control line group 150 in the first row is given the reference numeral "150[1]".

The control line group 150 of each row is connected to the vertical scan unit 30. The vertical scan unit 30 feeds control signals for driving the pixels P to the pixels P through the control lines.

In each column of the pixel array of the pixel unit 10, an output line 152 is arranged along a second direction (longitudinal direction in FIG. 1) intersecting with the first direction. The output lines 152 are connected to the pixels P arranged along the second direction and each forms a common signal line for the pixels P in the corresponding column.

The second direction along which the output lines 152 extend is also referred to as "column direction" or "vertical direction".

In FIG. 1, the output lines 152 are illustrated with reference numerals indicating column numbers. For example, the output line 152 of the first column is illustrated with the reference numeral "152[1]". The pixels P of a row selected by the vertical scan unit 30 output pixel signals, which are digital signals, to the output lines 152.

The pixel signals are typically digital signals of a plurality of bits. The output lines 152 can be in the form of a bus including a plurality of signal lines that transmits corresponding 1-bit signals among the digital signals of the plurality of bits. This enables parallel transmission of the digital signals of the different bits. Further, the plurality of buses can be provided for the pixels P of one column. A bus of the plurality of buses is connected to the pixels P of a row of the plurality of rows, and another bus of the plurality of buses is connected to the pixels P of another row of the plurality of rows. This enables parallel reading of the digital signals of the pixels P of the plurality of rows. The disclosure is not limited to the foregoing configuration. Alternatively, only one output line 152 can correspond to the pixels P of one column, and the digital signals of the plurality of bits can be transmitted serially.

The output lines 152 are connected to the signal processing units 40. The signal processing units 40 are provided correspondingly to the respective columns of the pixel unit 10, and each signal processing unit 40 is connected to the output line 152 of the corresponding column.

Each signal processing unit 40 includes a holding unit that holds the pixel signals output from the pixels P of the corresponding column through the corresponding output line 152.

The horizontal scan unit 50 is a circuit unit that feeds control signals for reading signals from the signal processing units 40, to the signal processing units 40. The horizontal scan unit 50 feeds the control signals to the signal processing units 40 of the respective columns through control lines 154. The signal processing units 40 having received the control signals from the horizontal scan unit 50 output the signals held in the holding units to the output unit 60. The horizontal scan unit 50 selects the signal processing units 40 of the plurality of columns sequentially in units of one column or two or more columns to perform a column scan (horizontal scan). A horizontal synchronization signal HD is input to the horizontal scan unit 50 from the control unit 20. In a case where the horizontal synchronization signal HD changes in level, the horizontal scan unit 50 starts a horizontal scan (second scan) on the signal processing unit 40 of the corresponding column. Typically, the horizontal scan unit 50 starts a horizontal scan on the signal processing unit 40 of the corresponding column in a case where the horizontal synchronization signal HD changes from low level to high level. The horizontal synchronization signal HD is a signal that controls a cycle of performing a horizontal scan.

In FIG. 1, the control lines 154 are illustrated with reference numerals indicating column numbers. For example, the control line 154 of the first column is illustrated with the reference numeral "154[1]".

The output unit 60 is a circuit unit that externally outputs signals output from the signal processing units 40 from the photoelectric conversion apparatus 100. The output unit 60 can perform various types of processing such as noise reduction processing and correction processing on the signals before outputting the signals externally from the photoelectric conversion apparatus 100.

The control unit 20 is a circuit unit that feeds control signals for controlling operations of the vertical scan unit 30, the signal processing units 40, the horizontal scan unit 50, and the output unit 60 and timings of the operations.

A central processing unit (CPU) 70 is a circuit unit that controls the photoelectric conversion apparatus 100 via the control unit 20 by executing programs.

At least some of the control signals for controlling the operations of the control unit 20, the vertical scan unit 30, the signal processing units 40, the horizontal scan unit 50, the output unit 60, and the CPU 70 and the timings of the operations can be fed from the outside of the photoelectric conversion apparatus 100.

[Pixel P(m, n)]

Figure 2:
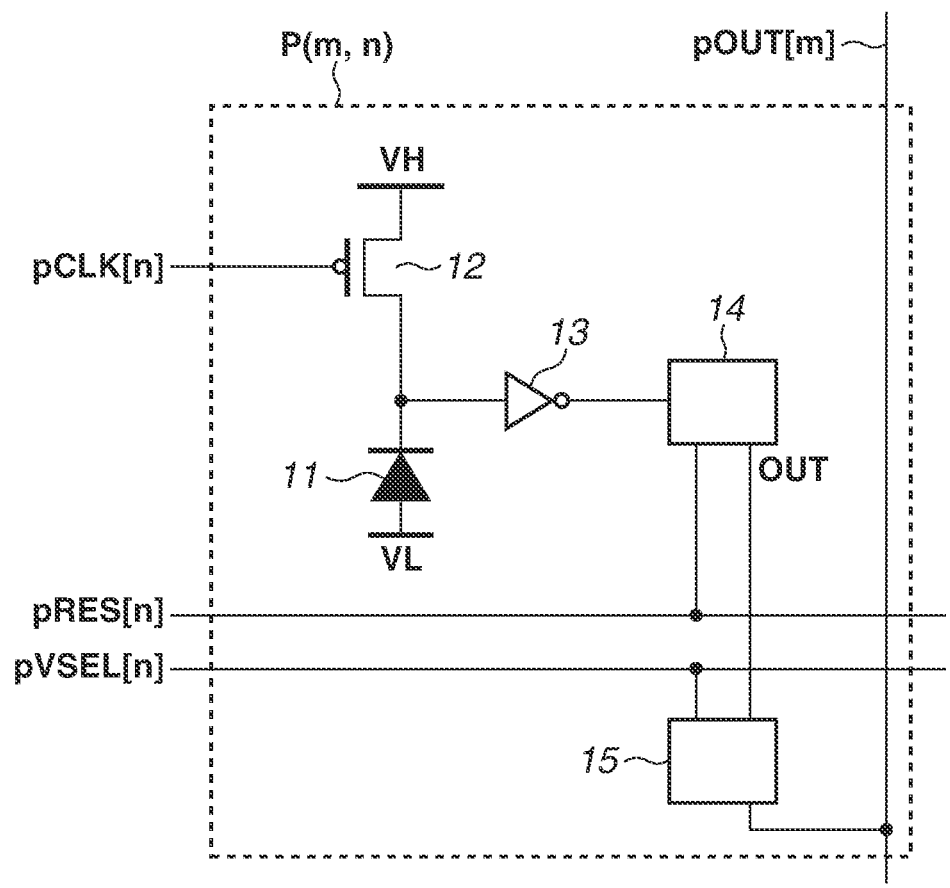
FIG. 2 is a diagram illustrating a configuration of a pixel.

FIG. 2 is a diagram illustrating a configuration of the pixel P(m, n) of the photoelectric conversion apparatus 100 according to the present exemplary embodiment.

The pixel P(m, n) includes an avalanche photodiode (APD) 11, the quench element 12, a waveform shaping unit 13, a counter 14, and a pixel output circuit 15.

The APD 11 generates a pair of charges by photoelectric conversion based on incident light (based on incidence of photons). A voltage VL (first voltage) is fed to an anode of the APD 11. Further, a voltage VH (second voltage) higher than the voltage VL fed to the anode is fed to a cathode of the APD 11. A reverse bias voltage is fed to the anode and the cathode to cause the APD 11 to perform an avalanche multiplication operation. With the voltage fed, electric charges (seed charges) generated by incident light cause avalanche multiplication, and an avalanche current is generated.

The APD operates in a Geiger mode and a linear mode. In the Geiger mode, the APD is operated with a potential difference between the anode and the cathode that is greater than a breakdown voltage in a case where the reverse-bias voltage is fed. In the linear mode, the APD is operated with a potential difference between the anode and the cathode that is near the breakdown voltage or less than or equal to the breakdown voltage in a case where the reverse-bias voltage is fed.

An APD that is operated in the Geiger mode is referred to as "single photon avalanche diode" (SPAD). For example, the voltage VL (first voltage) is −30 V, and the voltage VH (second voltage) is 3 V. The APD 11 can be operated in the linear mode or in the Geiger mode.

The quench element 12 is connected to the APD 11 and a power line that feeds the voltage VH. The quench element 12 functions as a load circuit (quench circuit) during signal multiplication by avalanche multiplication.

The quench element 12 can configured by a transistor. For example, the quench element 12 can configured by a metal oxide semiconductor (MOS) transistor. In FIG. 2, a case where the quench element 12 is a PMOS transistor is illustrated.

The signal pCLK is input to a gate, which is a control node, of the quench element 12. In a case where the signal pCLK is inactive, the quench element 12 is in a non-conductive state (OFF state). On the other hand, in a case where the signal pCLK is active, the quench element 12 is in a conductive state (ON state). The quench element 12 in the non-conductive state operates to reduce the voltage fed to the APD 11 so as to prevent avalanche multiplication (quench operation). On the other hand, the quench element 12 in the conductive state operates to cause a current to flow by an amount corresponding to a voltage drop caused by the quench operation to thereby restore the voltage to be fed to the APD 11 to the voltage VH (recharge operation). When the quench element 12 is in the OFF state, an electric path between the power line feeding the voltage VH and the APD 11 needs not be completely non-conductive (blocked), and the electric path is to be controlled to a resistance value for the quench operation. Thus, when the quench element 12 is the OFF state, the resistance value of the electric path between the power line and the APD 11 is to be greater than the resistance value when the quench element 12 is in the ON state.

The signal pCLK[n] is fed to the gate of the quench element 12 through a control line (not illustrated in FIG. 1) to switch the quench element 12 between the conductive state and the non-conductive state. The signal pCLK is a pulse signal that is input to the gate of the quench element 12 as a control signal defining a start and an end of an exposure period of the pixels P.

The waveform shaping unit 13 shapes a change in potential of the cathode of the APD 11 that is obtained during photon detection, and the waveform shaping unit 13 outputs a pulse signal. An inverter circuit, for example, is used as the waveform shaping unit 13. While FIG. 2 illustrates an example using a single inverter as the waveform shaping unit 13, a circuit with a plurality of inverters connected in series can be used. Further, another circuit that has a waveform shaping effect can be used as the waveform shaping unit 13.

The counter 14 counts the number of pulse signals output from the waveform shaping unit 13 and holds the count value. Further, the signal pRES[n] is fed to the counter 14 from the vertical scan unit 30 through a control line (not illustrated in FIG. 1). In a case where the signal pRES[n] is active, the count value held by the counter 14 is reset to an initial value. While the initial value is typically a value with all bits set to zero, the count value can be reset to a different initial value.

The signal pVSEL[n] is fed to the pixel output circuit 15 from the vertical scan unit 30 through a control line. The signal pVSEL[n] switches between an electrical connection and an electrical disconnection between the counter 14 and a signal line pOUT[m]. The pixel output circuit 15 includes, for example, a buffer circuit for outputting signals.

Further, a switch such as a transistor can be provided between the APD 11 and the quench element 12 to switch between the electrical connection and the electrical disconnection. Similarly, the configuration illustrated in FIG. 2 can further include a switch such as a transistor that switches between a state of feeding the voltage VH to the quench element 12 and a state of not feeding the voltage VH to the quench element 12. The switch can be provided to each pixel P or each pixel row. Further, a single switch can be shared by all the pixels P. Similarly, the configuration illustrated in FIG. 2 can further include a switch such as a transistor that switches between a state of feeding the voltage VL to the APD 11 and a state of not feeding the voltage VL to the APD 11. The switch can be provided to each pixel P or each pixel row. Further, a single switch can be shared by all the pixels P.

According to the present exemplary embodiment, a configuration that uses the counter 14 is described. Alternatively, the photoelectric conversion apparatus 100 can employ a time-to-digital converter (TDC) and a memory instead of using the counter 14 to obtain pulse detection timings. In this case, a generation timing of a pulse signal output from the waveform shaping unit 13 is converted into a digital signal by the TDC. A signal pREF[n] is fed to the TDC from the vertical scan unit 30 illustrated in FIG. 1 through a control line (not illustrated in FIG. 1) to measure the timing of the pulse signal. The TDC obtains, as the digital signal, a signal in a case where an input timing of a signal output from each pixel P via the waveform shaping unit 13 is a relative time using the signal pREF[n] as a reference.

[Control Unit 20]

Figure 3:
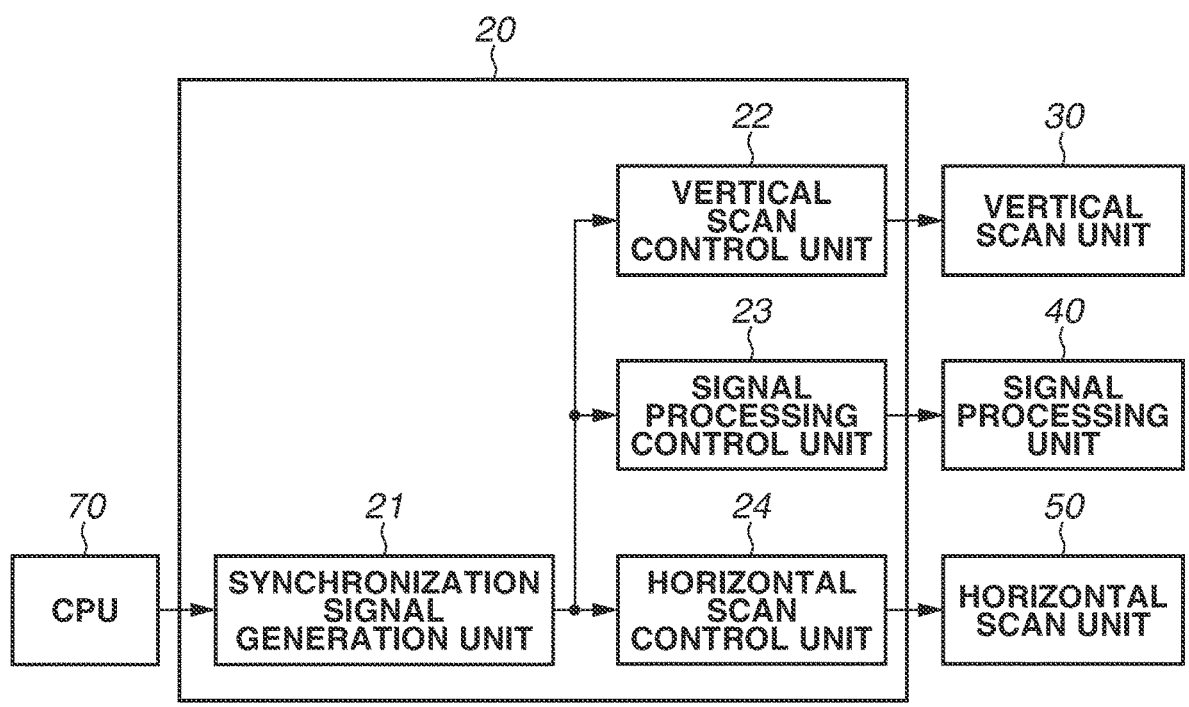
FIG. 3 is a diagram illustrating a configuration of a control unit.

FIG. 3 is a diagram illustrating a configuration of the control unit 20. A control signal is input to the control unit 20 from the CPU 70 provided outside the control unit 20. The control unit 20 includes a synchronization signal generation unit 21, a vertical scan control unit 22, a signal processing control unit 23, and a horizontal scan control unit 24.

The synchronization signal generation unit 21 generates a vertical synchronization signal VD, the horizontal synchronization signal HD, and a clock MCLK (clock signal) based on control by the CPU 70. The vertical synchronization signal VD is a signal for controlling a period of one frame. Typically, a start of a vertical scan by the vertical scan unit 30 is controlled based on the vertical synchronization signal VD. The horizontal synchronization signal HD is a signal for switching a selected pixel row in a vertical scan and a horizontal scan. The horizontal synchronization signal HD is a signal for controlling reading processing of reading the pixels P of each row. Further, the vertical synchronization signal VD is a signal for controlling reading processing of reading signals from the entire pixel unit 10.

The vertical scan control unit 22 generates a signal for controlling a driving timing of the vertical scan unit 30 and outputs the generated signal to the vertical scan unit 30.

The signal processing control unit 23 generates a signal for controlling a driving timing of the signal processing unit 40 and outputs the generated signal to the signal processing unit 40.

The horizontal scan control unit 24 generates a signal for controlling a driving timing of the horizontal scan unit 50 and outputs the generated signal to the horizontal scan unit 50.

[Vertical Scan Control Unit 22]

Figure 4:
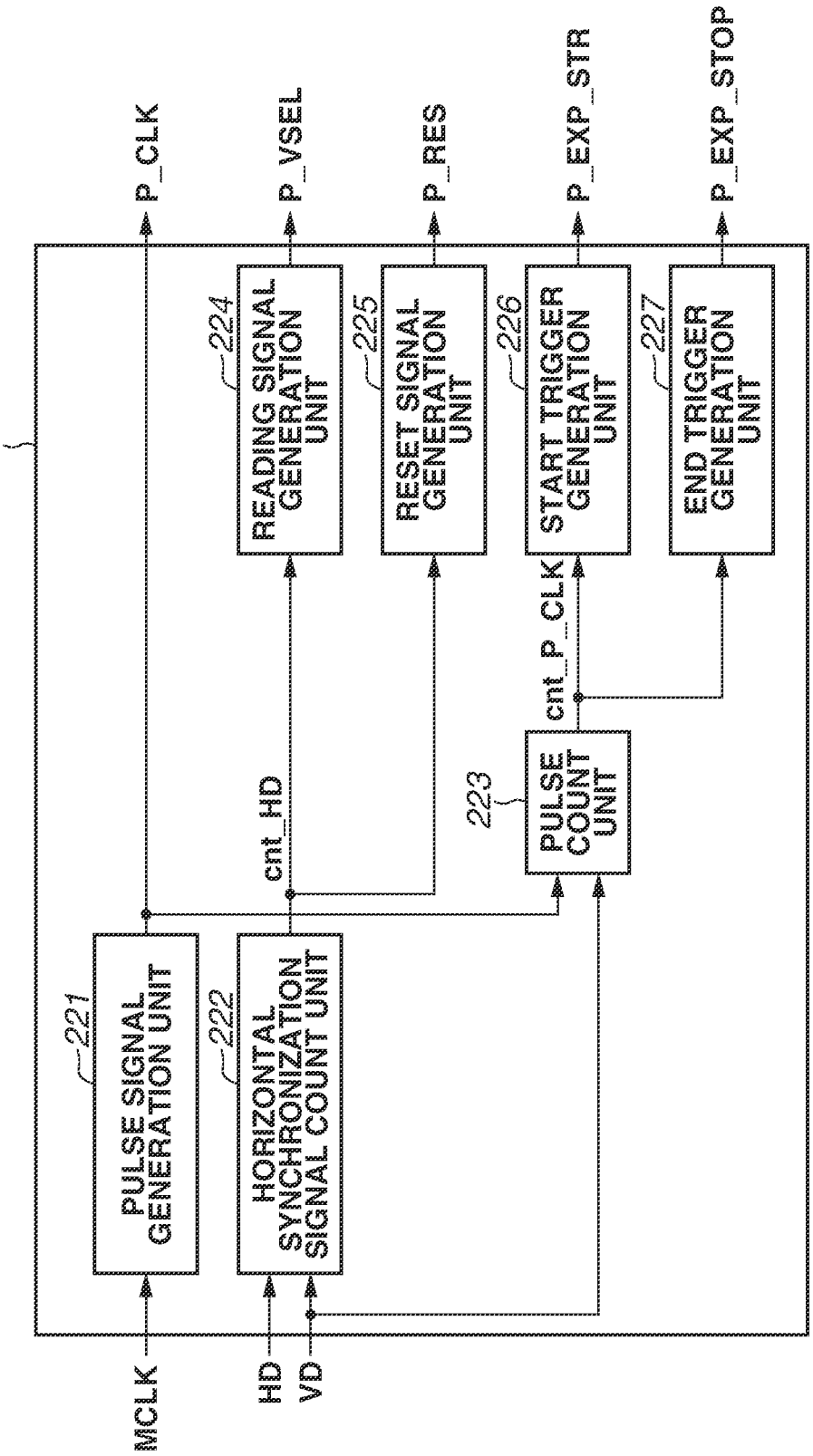
FIG. 4 is a diagram illustrating a configuration of a vertical scan control unit according to a first exemplary embodiment.

FIG. 4 is a diagram illustrating a configuration of the vertical scan control unit 22. The vertical scan control unit 22 includes a pulse signal generation unit 221, a horizontal synchronization signal count unit 222, a pulse count unit 223, a reading signal generation unit 224, a reset signal generation unit 225, a start trigger generation unit 226, and an end trigger generation unit 227.

The pulse signal generation unit 221 includes a frequency dividing circuit (not illustrated) and generates a signal P_CLK by dividing the clock MCLK. With the clock MCLK used as an original signal, a cycle of the signal P_CLK is controllable in units of one cycle of the clock MCLK. The signal P_CLK is input to the vertical scan unit 30, and the input signal is then input as the control signal pCLK to the pixel unit 10.

The horizontal synchronization signal count unit 222 receives the vertical synchronization signal VD and the horizontal synchronization signal HD as input, counts the horizontal synchronization signal HD during one cycle of the vertical synchronization signal VD, and outputs a count value cnt_HD.

The pulse count unit 223 receives the vertical synchronization signal VD and the signal P_CLK as input, counts the signals P_CLK during one cycle of the vertical synchronization signal VD, and outputs a count value cnt_P_CLK.

The reading signal generation unit 224 receives the count value cnt_HD as input and generates a signal P_VSEL corresponding to the count value cnt_HD.

The reset signal generation unit 225 receives the count value cnt_HD as input and generates a signal P_RES corresponding to the count value cnt_HD.

The start trigger generation unit 226 receives the count value cnt_P_CLK as input and generates a signal P_EXP_STR corresponding to the count value cnt_P_CLK. The signal P_EXP_STR herein is a first control signal for controlling an exposure start timing of the pixels P.

The end trigger generation unit 227 receives the count value cnt_P_CLK as input and generates a signal P_EXP_STOP corresponding to the count value cnt_P_CLK. The signal P_EXP_STOP is a second control signal for controlling an exposure end timing of the pixels P.

[Vertical Scan Unit 30]

Figure 5:
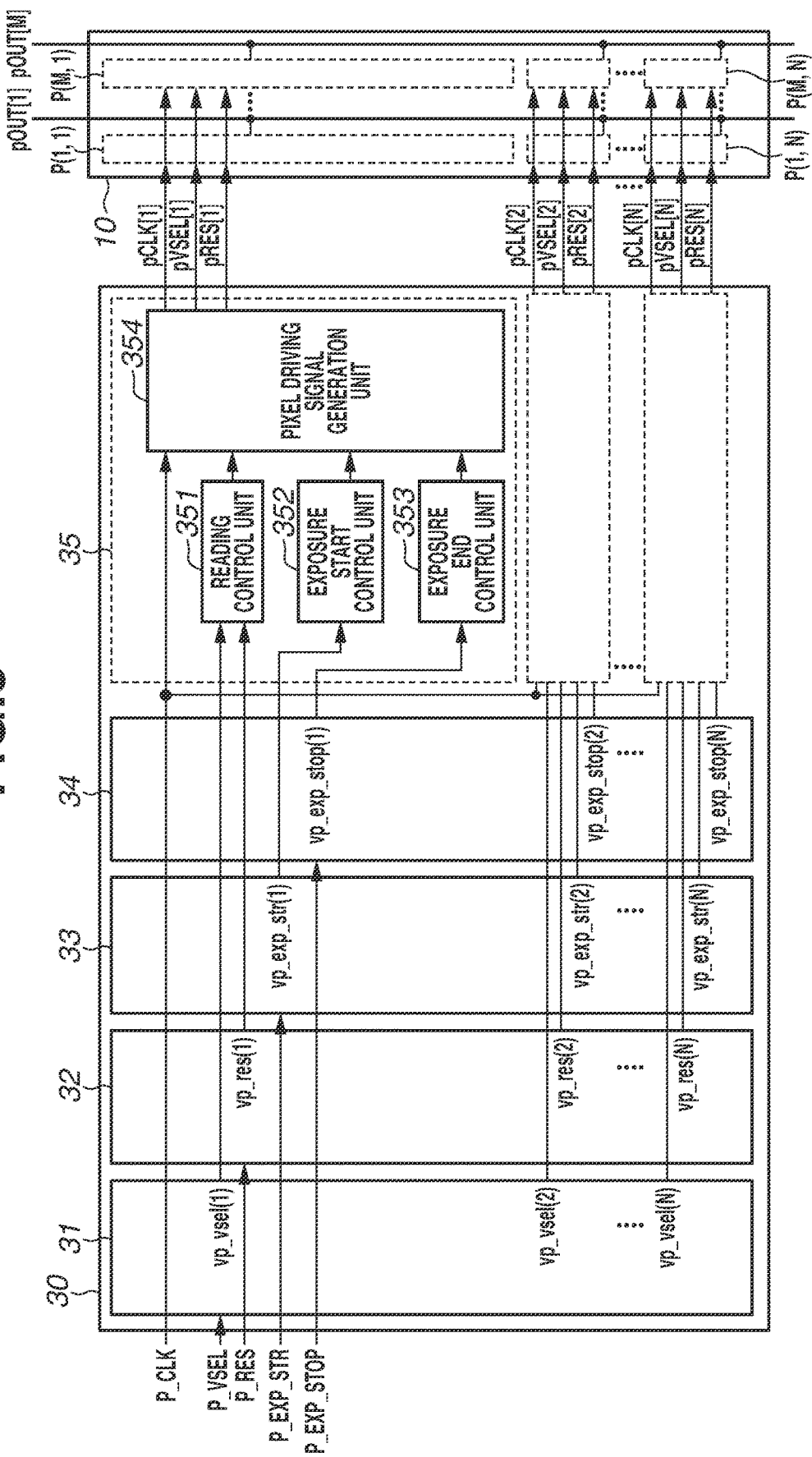
FIG. 5 is a diagram illustrating a configuration of a vertical scan unit according to the first exemplary embodiment.

FIG. 5 is a diagram illustrating a configuration of the vertical scan unit 30. The vertical scan unit 30 includes a first decoder unit 31, a second decoder unit 32, a third decoder unit 33, a fourth decoder unit 34, and N row driving units 35 provided for each pixel row of the pixel unit 10. Each row driving unit 35 is configured to drive one pixel row of the pixel unit 10 in the present exemplary embodiment but can be configured to drive a plurality of pixel rows.

The first decoder unit 31 decodes the signal P_VSEL generated by the vertical scan control unit 22, generates reading row selection signals vp_vsel(1) to vp_vsel(N), and outputs the generated reading row selection signals vp_vsel(1) to vp_vsel(N) to the row driving units 35.

Similarly, the second decoder unit 32 decodes the signal P_RES generated by the vertical scan control unit 22, generates reset row selection signals vp_res(1) to vp_res(N), and outputs the generated reset row selection signals vp_res(1) to vp_res(N) to the row driving units 35.

Similarly, the third decoder unit 33 decodes the signal P_EXP_STR generated by the vertical scan control unit 22, generates exposure start row selection signals vp_exp_str(1) to vp_exp_str(N), and outputs the generated exposure start row selection signals vp_exp_str(1) to vp_exp_str(N) to the row driving units 35.

Similarly, the fourth decoder unit 34 decodes the signal P_EXP_STOP generated by the vertical scan control unit 22, generates exposure end row selection signals vp_exp_stop(1) to vp_exp_stop(N), and outputs the generated exposure end row selection signals vp_exp_stop(1) to vp_exp_stop(N) to the row driving units 35.

Each row driving unit 35 includes a reading control unit 351, an exposure start control unit 352, an exposure end control unit 353, and a pixel driving signal generation unit 354.

While mainly a configuration of the row driving unit 35 of the first row will be described below, the row driving units 35 of the other rows have a similar configuration.

The reading row selection signal vp_vsel(1) output from the first decoder unit 31 and the reset row selection signal vp_res(1) output from the second decoder unit 32 are input to the reading control unit 351. The reading control unit 351 is controlled by a reading control signal and stores a level of the reading row selection signal vp_vsel(1) and a level of the reset row selection signal vp_res(1). An output signal of the reading control unit 351 is a signal for resetting the counters 14 of the pixels P of the corresponding row and connecting the counters 14 to the signal lines pOUT.

The exposure start row selection signal vp_exp_str(1) output from the third decoder unit 33 is input to the exposure start control unit 352. The exposure start control unit 352 stores a level of the exposure start row selection signal vp_exp_str(1). An output signal of the exposure start control unit 352 is a signal (start signal) for starting an exposure of the pixels P of the corresponding row.

The exposure end row selection signal vp_exp_stop(1) output from the fourth decoder unit 34 is input to the exposure end control unit 353. The exposure end control unit 353 is controlled by an exposure end control signal and stores a level of the exposure end row selection signal vp_exp_stop(1).

An output signal of the exposure end control unit 353 is a signal (end signal) for ending an exposure of the pixels P of the corresponding row.

The reading row selection signal vp_vsel(1) and the reset row selection signal vp_res(1) stored in the reading control unit 351, the exposure start row selection signal vp_exp_str(1) stored in the exposure start control unit 352, and the exposure end row selection signal vp_exp_stop(1) stored in the exposure end control unit 353 are input to the pixel driving signal generation unit 354. Using these input signals, the pixel driving signal generation unit 354 performs reading, reset processing, exposure start processing, and exposure end processing on the corresponding pixel row. Further, timings of performing the foregoing processing are controlled by signals input to the pixel driving signal generation unit 354. The pixel driving signal generation unit 354 outputs pixel driving signals for the foregoing processing to the corresponding pixel row. The pixel driving signals that are output from the pixel driving signal generation unit 354 are the signals pCLK[1], pVSEL[1], and pRES[1]. Each pixel driving signal generation unit 354 is configured to drive one row of the pixel unit 10 in the present exemplary embodiment but can be configured to drive two or more rows of the pixel unit 10.

[Operation of Pixel Driving Signal]

Operations of the photoelectric conversion apparatus 100 illustrated in FIG. 1 according to the first exemplary embodiment will be described below.

Figure 6:
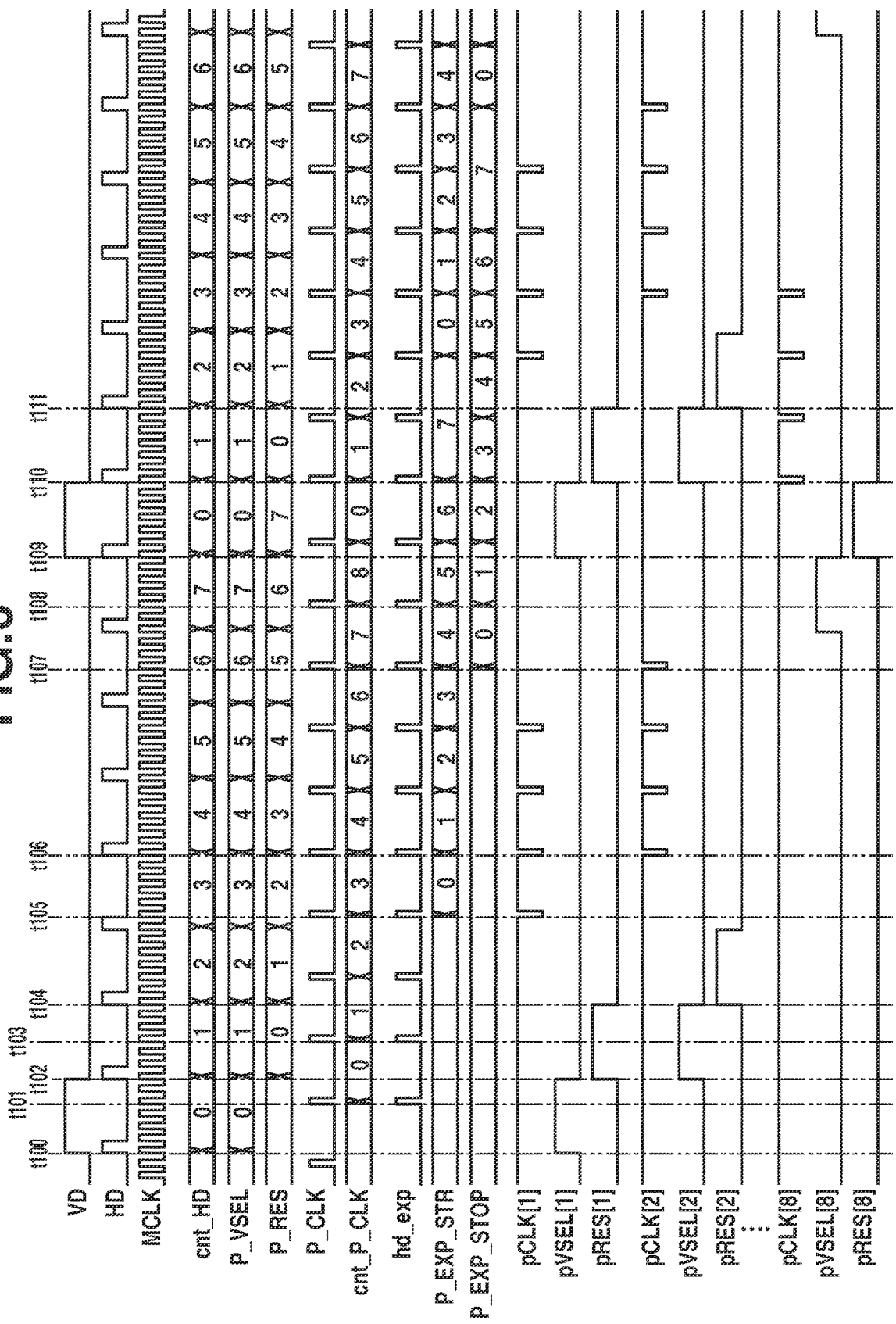
FIG. 6 is a timing chart illustrating pixel driving according to the first exemplary embodiment.

FIG. 6 is a timing chart illustrating an example of operations of the vertical scan control unit 22, the vertical scan unit 30, and the pixel unit 10. The operations will be described below with reference to FIG. 6.

<Input of Vertical Scan Control Unit 22>

First, the CPU 70 executes a program, and a signal for controlling the photoelectric conversion apparatus 100 is fed to the control unit 20.

Based on the fed signal, the synchronization signal generation unit 21 in the control unit 20 generates the vertical synchronization signal VD, the horizontal synchronization signal HD, and the clock MCLK. The generated signals are fed to the vertical scan control unit 22, the signal processing control unit 23, and the horizontal scan control unit 24.

<Counter Value cnt_HD>

At time t100, once the vertical synchronization signal VD changes to a high level, the counter value cnt_HD is initialized to the value "0" based on the change of the vertical synchronization signal VD to the high level.

At time t102, once the horizontal synchronization signal HD changes to a high level, the counter value cnt_HD is incremented based on the change of the horizontal synchronization signal HD to the high level and is changed to the value "1". The counter value cnt_HD is incremented every time the horizontal synchronization signal HD changes to the high level.

<Counter Value cnt_P_CLK>

At time t100, once the vertical synchronization signal VD changes to the high level, the pulse count unit 223 starts counting the signals P_CLK.

At time t101, once the signal P_CLK changes to a high level, the counter value cnt_P_CLK is initialized to the value "0".

At time t103, once the signal P_CLK changes to the high level, the counter value cnt_P_CLK is incremented based on the change of the signal P_CLK to the high level and is changed to the value "1". The counter value cnt_P_CLK is incremented every time the signal P_CLK changes to the high level.

<Reset Processing>

At time t102, the signal P_RES changes to the value "0" based on cnt_HD=1.

The value "0" is a preset value and can be controlled by a register. Further, timings at which the signal P_RES is changed to the value "0" do not necessarily need to be timings at which the counter value cnt_HD is the value "1" and can be controlled by a register.

At time t104, once the horizontal synchronization signal HD changes to the high level, the signal P_RES changes (is incremented) to the value "1" based on the change of the horizontal synchronization signal HD to the high level. A range of the change does not necessarily need to be +1. Further, the signal P_RES can change to a specific value. Settings for the change can be controlled using setting information held in a register. Thereafter, the signal P_RES is incremented (+1) every time the horizontal synchronization signal HD change to the high level.

Further, at time t102, once the value of the signal P_RES changes to the value "0", the signal pRES[1] changes to a high level, and the first row of the pixel unit 10 becomes a reset processing target row. The signal pRES[1] controls the counters 14 of the pixels P, and in a case where the signal pRES[1] is at the high level, the count values held by the counters 14 are reset.

At time t104, once the value of the signal P_RES changes to the value "1", the first row of the pixel unit 10 is no longer a reset processing target row, and the signal pRES[1] changes to a low level.

<Exposure Start Processing and Exposure End Processing>

At time t101, a signal hd_exp changes to a high level based on cnt_P_CLK=0. The value "0" is a preset value and can be controlled by a register. Thereafter, the signal hd_exp changes to the high level every time the counter value cnt_P_CLK is incremented once. Timings at which the signal hd_exp changes to the high level can be every time the counter value cnt_P_CLK is incremented twice, every time the counter value cnt_P_CLK is incremented three times, or timings at which the counter value cnt_P_CLK is a specific value, and the timings can be controlled by a register.

At time t105, the signal P_EXP_STR changes to the value "0" based on cnt_P_CLK=3. The value "0" is a preset value and can be controlled by a register. Further, timings at which the signal P_EXP_STR changes to the value "0" do not necessarily need to be timings at which the counter value cnt_P_CLK is the value "3", and the timings can be controlled by a register.

At time t106, once the signal hd_exp changes to a high level, the signal P_EXP_STR changes to the value "1" based on the change of the signal hd_exp to the high level. A range of the change does not necessarily need to be +1. Further, the signal P_EXP_STR can change to a specific value. Settings for the change can be controlled using setting information held by a register. Thereafter, the signal P_EXP_STR is incremented (+1) every time the signal hd_exp changes to the high level.

Further, at time t105, once the value of the signal P_EXP_STR changes to the value "0", the first row of the pixel unit 10 becomes an exposure start processing target row. Thus, the vertical scan unit 30 starts feeding the signal pCLK[1]. The signal pCLK[1] is generated using the signal P_CLK. The signal pCLK[1] controls the quench elements 12 of the pixels P of the first row of the pixel unit 10 and controls the voltages fed to the APDs 11. Since the quench elements 12 are PMOS transistors, the quench elements 12 are in the OFF state in a case where the signal pCLK is at a high level, whereas the quench elements 12 are in the ON state in a case where the signal pCLK is at a low level.

At time t107, the signal P_EXP_STOP changes to the value "0" based on cnt_P_CLK=7. The value "0" is a preset value and can be controlled by a register. Further, timings at which the signal P_EXP_STOP changes to the value "0" do not necessarily need to be timings at which the counter value cnt_P_CLK is the value "7", and the timings can be controlled by a register.

At time t108, once the signal hd_exp changes to the high level, the signal P_EXP_STOP changes to the value "1" based on the change of the signal hd_exp to the high level. A range of the change does not necessarily need to be +1, and the signal P_EXP_STOP can change to a specific value. This can be controlled by a register. Thereafter, the signal P_EXP_STOP is incremented (+1) every time the signal hd_exp changes to the high level.

Further, at time t107, once the value of the signal P_EXP_STOP changes to the value "0", the first row of the pixel unit 10 becomes an exposure end processing target row, and the feeding of the signal pCLK[1] is ended.

The period from time t105 to time t107 is the exposure time of the first row of the pixel unit 10.

The timings at which the signal P_EXP_STR changes to the value "0" and timings at which the signal P_EXP_STOP changes to the value "0" are controlled by the counter value cnt_P_CLK. This enables control of the exposure time in units of one cycle of the signal P_CLK.

<Reading Processing>

At time t109, the signal P_VSEL changes to the value "0" based on cnt_HD=0. The value "0" is a preset value and can be controlled by a register.

Further, timings at which the signal P_VSEL changes to the value "0" do not necessarily need to be timings at which the counter value cnt_HD is the value "0". For example, timings at which the signal P_VSEL changes can be adjusted to timings at which the counter value cnt_HD is a predetermined value based on the setting information held by the register.

At time t110, once the horizontal synchronization signal HD changes to the high level, the signal P_VSEL changes to the value "1" based on the change of the horizontal synchronization signal HD to the high level. A range of the change does not necessarily need to be +1, and the signal P_VSEL can change to a specific value. This can be controlled by a register. Thereafter, the signal P_VSEL is incremented (+1) every time the horizontal synchronization signal HD changes to the high level.

Further, at time t109, once the value of the signal P_VSEL changes to the value "0", the signal pVSEL[1] changes to a high level, and the first row of the pixel unit 10 becomes a reading processing target row. The signal pVSEL[1] controls the pixel output circuits 15 of the pixels P, and in a case where the signal pVSEL[1] is at the high level, the counters 14 are connected to the signal lines pOUT and read the count values.

At time t110, once the value of the signal P_VSEL changes to the value "1", the first row of the pixel unit 10 is no longer a reading processing target row, and the signal pVSEL[1] changes to a low level.

<Shifting of Each Processing target Row>

At time t104, once the value of the signal P_RES changes to the value "1", the second row of the pixel unit 10 becomes a reset processing target row.

At time t106, once the value of the signal P_EXP_STR changes to the value "1", the second row of the pixel unit 10 becomes an exposure start processing target row.

At time t108, once the value of the signal P_EXP_STOP changes to the value "1", the second row of the pixel unit 10 becomes an exposure end processing target row.

At time t110, once the value of the signal P_VSEL changes to the value "1", the second row of the pixel unit 10 becomes a reading processing target row.

Operations of the second row of the pixel unit 10 are similar to the operations of the first row of the pixel unit 10.

According to the present exemplary embodiment, the counter value cnt_P_CLK for counting the signals P_CLK is generated. Furthermore, the signal P_EXP_STR for controlling the start of exposure based on the counter value cnt_P_CLK and the signal P_EXP_STOP for controlling an end of exposure based on the counter value cnt_P_CLK are generated.

This enables control of the cycle of the signal P_CLK in units of one cycle of the clock MCLK, enables control of the signals P_EXP_STR and P_EXP_STOP in units of one cycle of the signal P_CLK, and enables control of the cycle and number of times of the feeding of the signal pCLK to the pixels P using the foregoing signals.

Further, the exposure time of the pixels P is controlled more precisely than a case where the start and the end of the exposure time are set in synchronization with the horizontal synchronization signal HD. According to the present exemplary embodiment, both the start and the end of the exposure period are set without synchronizing with the horizontal synchronization signal HD. Aspects of the embodiments are not limited to the foregoing example, and at least one of the start and the end of the exposure time is to be set without synchronizing with the horizontal synchronization signal HD. This enables precise control of at least one of the start and the end of the exposure period without being limited by the timings of the horizontal synchronization signal HD.

Further, according to the present exemplary embodiment, both the exposure start processing and the exposure end processing are set without synchronizing with the vertical synchronization signal HD. Aspects of the embodiments are not limited to the foregoing example, and timings of at least one of the exposure start processing and the exposure end processing are to be set without synchronizing with the vertical synchronization signal VD. This enables precise control of timings of at least one of the exposure start processing and the exposure end processing without being limited by the timings of the vertical synchronization signal VD.

Next, a photoelectric conversion apparatus according to a second exemplary embodiment of the disclosure will be described below with reference to FIGS. 7, 8, and 9, mainly differences from the first exemplary embodiment. The present exemplary embodiment is different from the first exemplary embodiment in the configuration of the vertical scan control unit 22 and the configuration of the row driving unit 35. Specifically, the vertical scan control unit 22 according to the first exemplary embodiment includes the pulse count unit 223 and the end trigger generation unit 227. The present exemplary embodiment is different from the first exemplary embodiment in the signal that the start trigger generation unit 226 uses in generating the signal P_EXP_STR. Further, the present exemplary embodiment is different from the first exemplary embodiment in that the signal for controlling the end of exposure is generated by another circuit different from the end trigger generation unit 227.

[Vertical Scan Control Unit 22]

Figure 7:
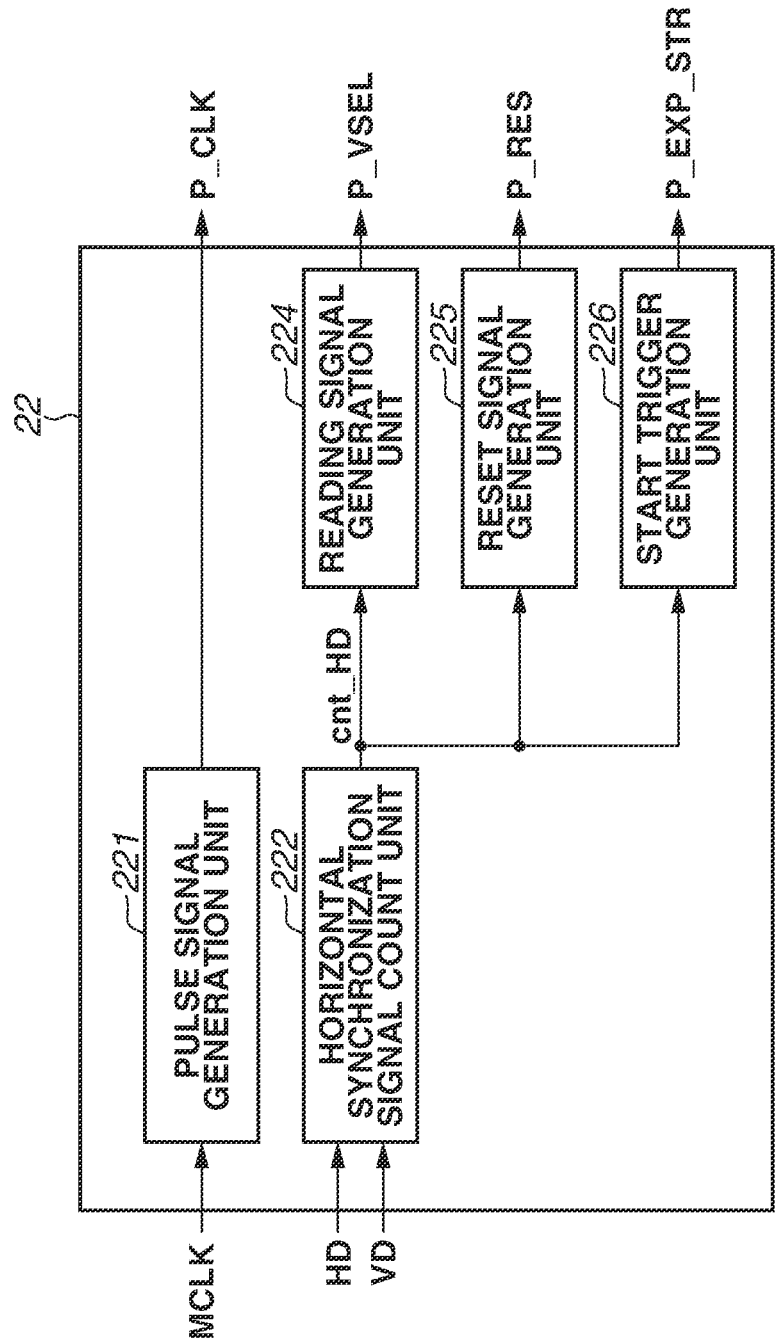
FIG. 7 is a diagram illustrating a configuration of a vertical scan control unit according to a second exemplary embodiment.

FIG. 7 is a diagram illustrating a configuration of the vertical scan control unit 22 according to the second exemplary embodiment. The vertical scan control unit 22 according to the present exemplary embodiment is different from the according to the first exemplary embodiment in that the pulse count unit 223 and the end trigger generation unit 227 are not included in the vertical scan control unit 22.

[Vertical Scan Unit 30]

Figure 8:
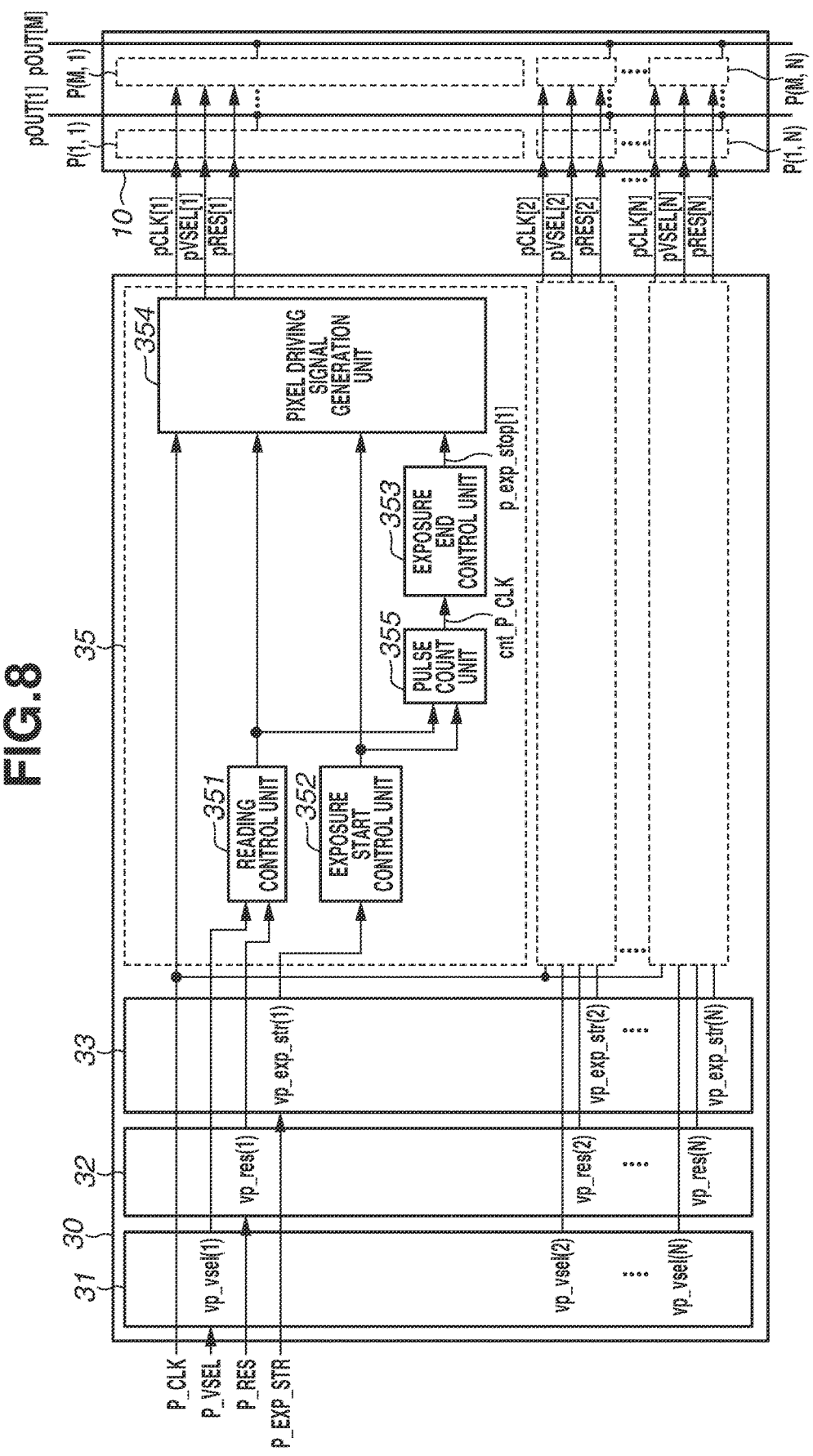
FIG. 8 is a diagram illustrating a configuration of a vertical scan unit according to the second exemplary embodiment.

FIG. 8 is a diagram illustrating a configuration of the vertical scan unit 30 according to the second exemplary embodiment. According to the present exemplary embodiment, the vertical scan unit 30 does not include the fourth decoder unit 34. Further, according to the present exemplary embodiment, the row driving unit 35 in the vertical scan unit 30 includes a pulse count unit 355.

[Operation of Pixel Driving Signal]

Figure 9:
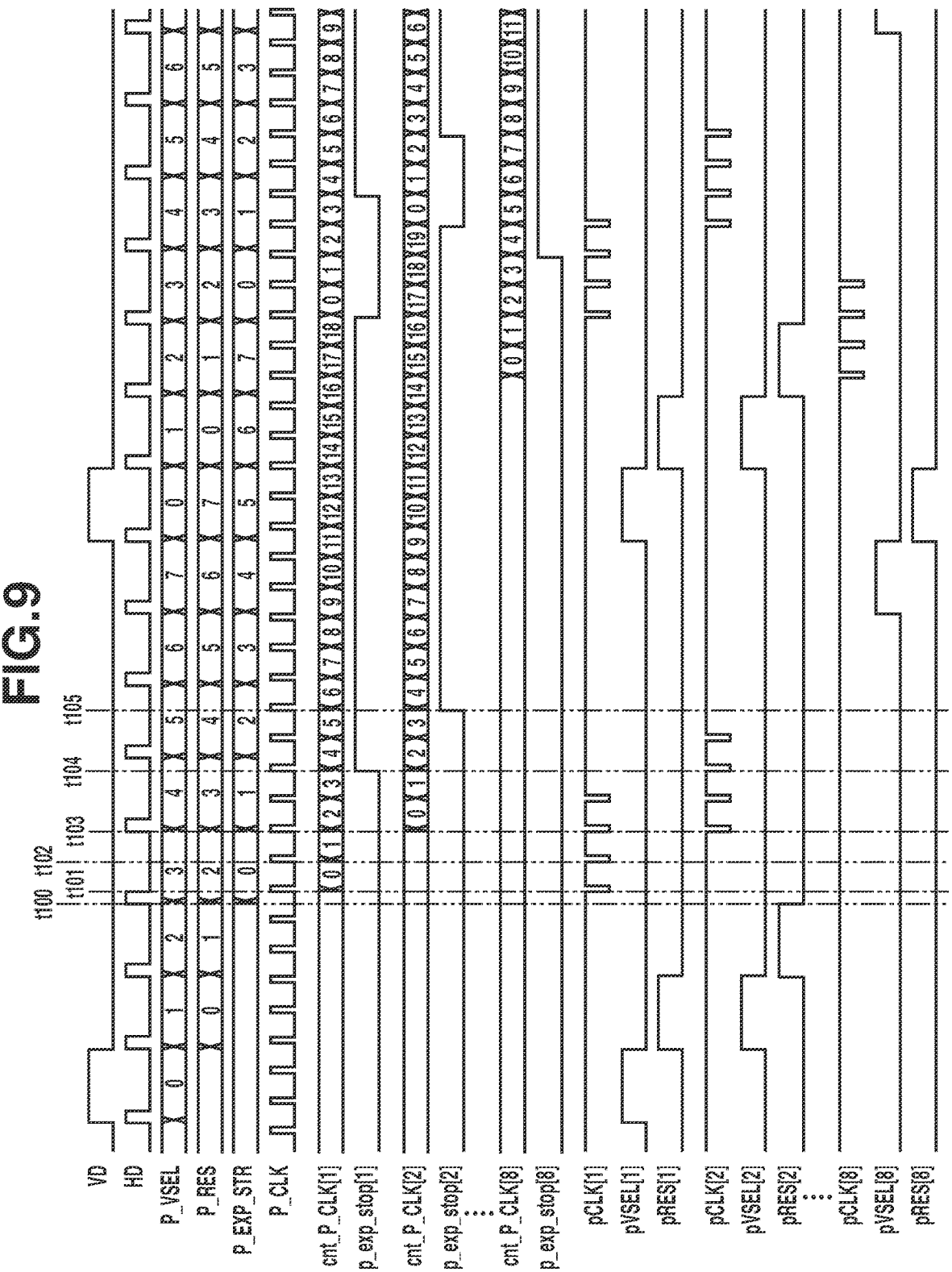
FIG. 9 is a timing chart illustrating pixel driving according to the second exemplary embodiment.

FIG. 9 is a timing chart illustrating an example of operations of the vertical scan unit 30 and the pixel unit 10 according to the second exemplary embodiment. The operations will be described below with reference to FIG. 9.

<Counter value cnt_P_CLK>

At time t100, once the value of the signal P_EXP_STR changes to the value "0", the pulse count unit 355 starts counting the signals P_CLK.

At time t101, once the signal P_CLK changes to the high level, the counter value cnt_P_CLK is initialized to the value "0".

At time t102, once the signal P_CLK changes to the high level, the counter value cnt_P_CLK is incremented based on the change of the signal P_CLK to the high level and is changed to the value "1". The counter value cnt_P_CLK is incremented every time the signal P_CLK changes to the high level.

<Exposure Start Processing and Exposure End Processing>

At time t100, once the value of the signal P_EXP_STR changes to the value "0", the first row of the pixel unit 10 becomes an exposure start processing target row, and the feeding of the signal pCLK[1] is started. The signal pCLK[1] is generated using the signal P_CLK.

At time t104, a signal p_exp_stop[1] changes to a high level based on cnt_P_CLK[1]=4. Timings at which the signal p_exp_stop[1] changes to the high level do not necessarily need to be timings at which the counter value cnt_P_CLK[1] is the value "4". For example, the timings can be controlled using the setting information held by the register.

At time t104, once the signal p_exp_stop[1] changes to the high level, the first row of the pixel unit 10 becomes an exposure end processing target row, and the feeding of the signal pCLK[1] is ended.

Specifically, the pulse count unit 355 of the row driving unit 35 controls the exposure period end processing. Typically, the row driving unit 35 is provided to each row of the pixels P. Further, the count value of the pulse count unit 355 of the row driving unit 35 of each row that corresponds to timings at which a signal p_exp_stop changes to the high level can be set as desired. Thus, timings of the exposure end processing can be set for each pixel row of the pixel unit 10 as desired.

The period from time t101 to time t104 is the exposure time of the first row of the pixel unit 10.

During the exposure time, the signal pCLK[1] controls the quench elements 12 of the pixels P of the first row of the pixel unit 10 and controls the voltages fed to the APDs 11.

<Shifting of Exposure Start processing and Exposure End processing Target Rows>

At time t103, once the value of the signal P_EXP_STR changes to the value "1", the second row of the pixel unit 10 becomes an exposure start processing target row.

At time t105, once the value of the counter value cnt_P_CLK[2] changes to the value "4", a signal p_exp_stop[2] changes to a high level based on the change of the value to the value "4", and the second row of the pixel unit 10 become an exposure end processing target row.

The operations of the second row of the pixel unit 10 are similar to the operations of the first row of the pixel unit 10, so that redundant descriptions thereof are omitted.

According to the present exemplary embodiment, the row driving units 35 each include the pulse count unit 355, and the inclusion of the pulse count units 355 facilitates control of exposure end processing. Further, with the pulse count units 355 included in the row driving units 35, timings of the exposure end processing can be set as desired for each pixel row of the pixel unit 10 as described above.

Next, a photoelectric conversion apparatus according to a third exemplary embodiment of the disclosure will be described below with reference to FIGS. 10, 11, and 12, mainly differences from the second exemplary embodiment. The present exemplary embodiment is different from the second exemplary embodiment in the configuration of the vertical scan control unit 22 and the configuration of the row driving unit 35. Specifically, the vertical scan control unit 22 includes a selection generation unit 228. The signal P_EXP_STR output from the start trigger generation unit 226 is input to the selection generation unit 228.

[Vertical Scan Control Unit 22]

Figure 10:
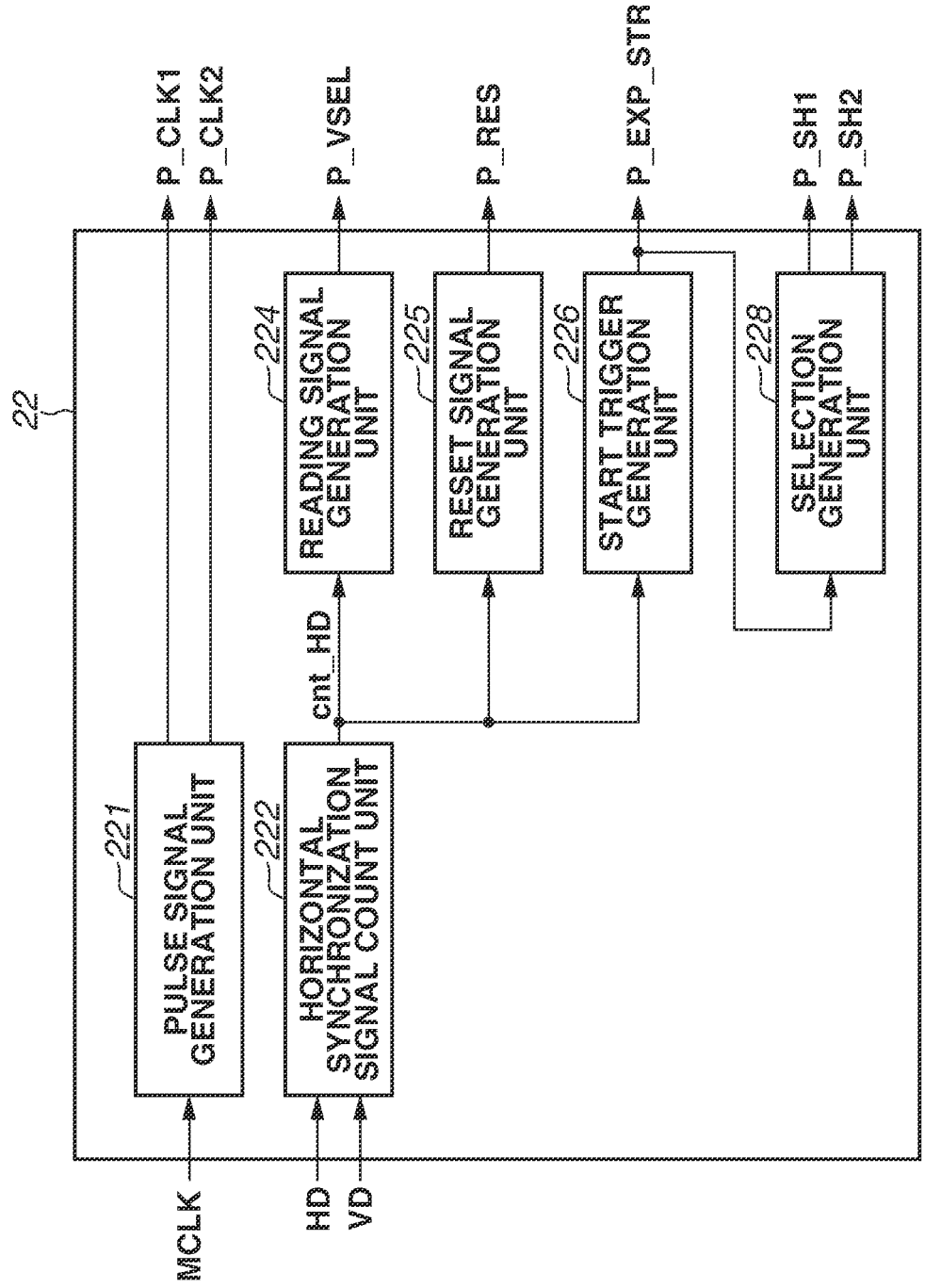
FIG. 10 is a diagram illustrating a configuration of a vertical scan control unit according to a third exemplary embodiment.

FIG. 10 is a diagram illustrating a configuration of the vertical scan control unit 22 according to the third exemplary embodiment. According to the present exemplary embodiment, the vertical scan control unit 22 includes the selection generation unit 228.

The selection generation unit 228 receives the signal P_EXP_STR as input and generates signals P_SH1 and P_SH2, each indicating a number. Two or more signals P_EXP_STR can be input, and three or more signals P_SH can be output.

Further, the pulse signal generation unit 221 outputs the signals P_CLK1 and P_CLK2 having different frequencies from each other. Three or more signals P_CLK can be output.

[Vertical Scan Unit 30]

Figure 11:
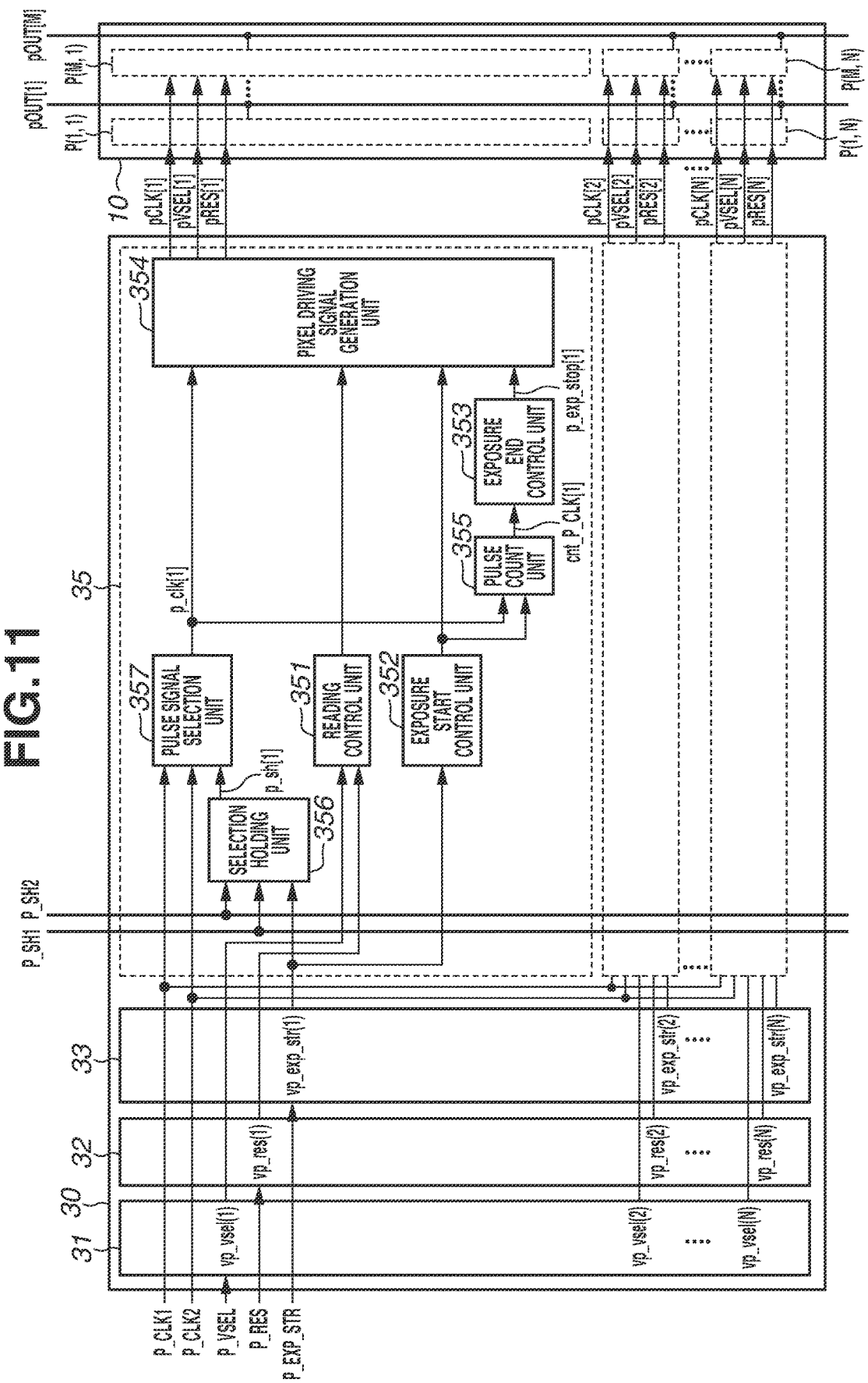
FIG. 11 is a diagram illustrating a configuration of a vertical scan unit according to the third exemplary embodiment.

FIG. 11 is a diagram illustrating a configuration of the vertical scan unit 30 according to the third exemplary embodiment. According to the present exemplary embodiment, the row driving units 35 in the vertical scan unit 30 each include a selection holding unit 356 and a pulse signal selection unit 357.

The selection holding unit 356 receives the signals P_SH1, P_SH2, and vp_exp_str(1) as input and generates a signal p_sh[1] indicating the number of the target row.

The pulse signal selection unit 357 receives the signals P_CLK1, P_CLK2, and p_sh[1] as input, selects one of the signals P_CLK1 and P_CLK2 as the signal P_CLK for use in the target row, and outputs the selected one of the signals P_CLK1 and P_CLK2 as a signal p_clk[1].

[Operation of Pixel Driving Signal]

Figure 12:
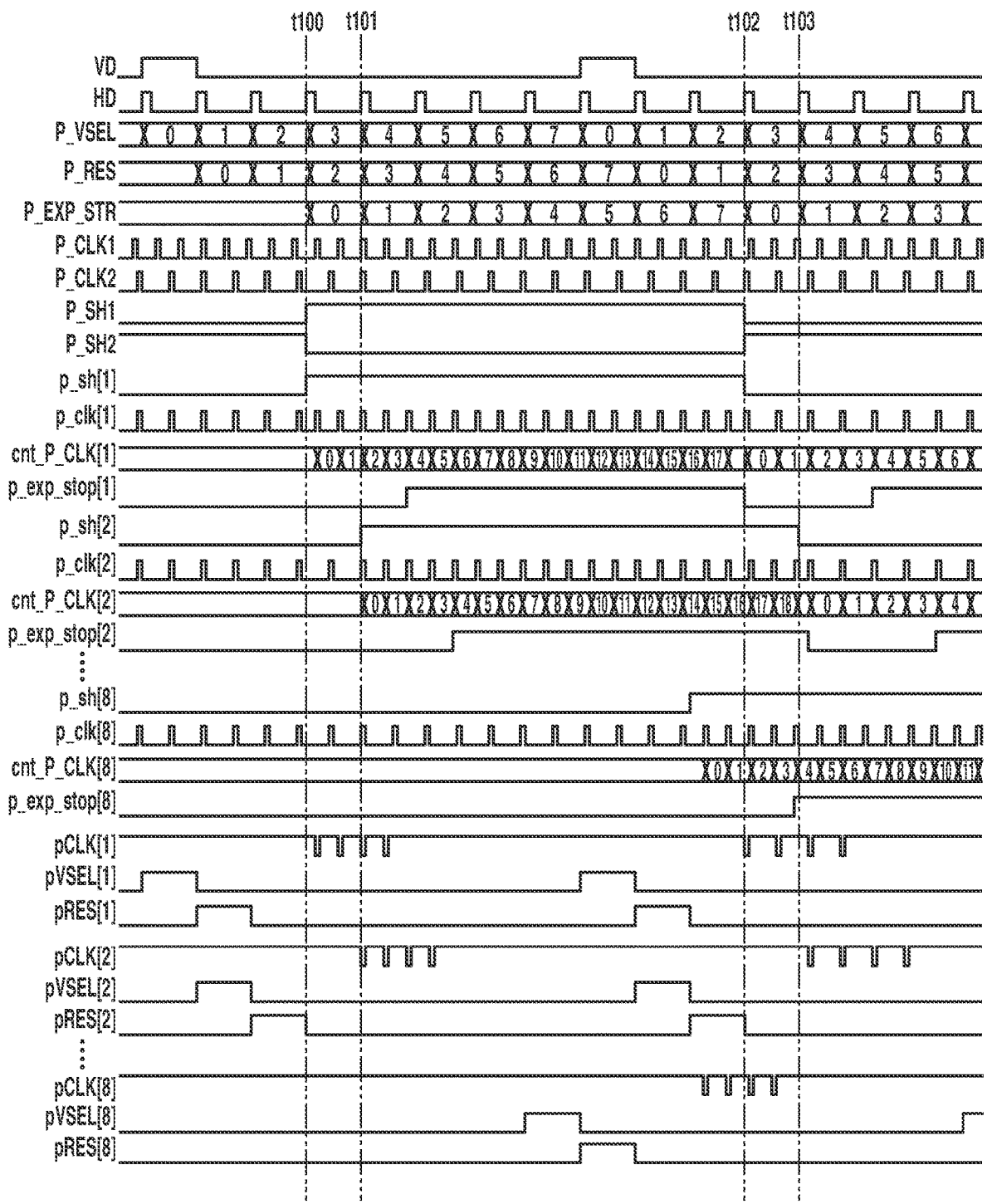
FIG. 12 is a timing chart illustrating pixel driving according to the third exemplary embodiment.

FIG. 12 is a timing chart illustrating an example of operations of the vertical scan control unit 22, the vertical scan unit 30, and the pixel unit 10 according to the third exemplary embodiment. The operations will be described below with reference to FIG. 12.

<Operation of Vertical Scan Control Unit 22>

At time t100, once the value of the signal P_EXP_STR changes to the value "0", the signal P_SH1 changes to a high level, and the signal P_SH2 changes to a low level, based on the change of the value to the value "0". At time t102, once the value of the signal P_EXP_STR changes to the value "0", the signal P_SH1 changes to a low level, and the signal P_SH2 changes to a high level, based on the change of the value to the value "0". Thereafter, the levels of the signals P_SH1 and P_SH2 switch between the high level and the low level every time the value of the signal P_EXP_STR changes to the value "0".

Timings at which the signals P_SH1 and P_SH2 switch do not necessarily need to be timings at which the signal P_EXP_STR is the value "0" and can be controllable by a register.

<Operation of Pixel Driving Signal>

At time t100, the value of the signal P_EXP_STR changes to the value "0", and the signal P_SH1 is at the high level whereas the signal P_SH2 is at the low level. At this time, the signal p_sh[1] changes to a high level.

At time t102, the value of the signal P_EXP_STR changes to the value "0", and the signal P_SH1 is at the low level whereas the signal P_SH2 is at the high level. At this time, the signal p_sh[1] changes to a low level.

During the period from time t100 to time t102 during which the signal p_sh[1] indicates the high level, the pulse signal selection unit 357 selects the signal P_CLK1 and outputs the selected signal P_CLK1 as the signal p_clk[1].

During the period during which the signal p_sh[1] indicates the low level, the pulse signal selection unit 357 selects the signal P_CLK2 and outputs the selected signal P_CLK2 as the signal p_clk[1].

Further, at time t100, once the value of the signal P_EXP_STR changes to the value "0", the first row of the pixel unit 10 becomes an exposure start processing target row, and the feeding of the signal pCLK[1] is started. The signal p_clk[1] is used as an original signal of the signal pCLK[1].

At time t101, the value of the signal P_EXP_STR changes to the value 1, and the signal P_SH1 is at the high level whereas the signal P_SH2 is at the low level. At this time, a signal p_sh[2] changes to a high level.

At time t103, the value of the signal P_EXP_STR changes to the value "1", and the signal P_SH1 is at the low level whereas the signal P_SH2 is at the high level. At this time, the signal p_sh[2] changes to a low level.

During the period from time t101 to time 103 during which the signal p_sh[2] indicates the high level, the pulse signal selection unit 357 selects the signal P_CLK1 and outputs the selected signal P_CLK1 as a signal p_clk[2].

During the period during which the signal p_sh[2] indicates the low level, the pulse signal selection unit 357 selects the signal P_CLK2 and outputs the selected signal P_CLK2 as the signal p_clk[2].

Further, at time t101, once the value of the signal P_EXP_STR changes to the value "1", the second row of the pixel unit 10 becomes an exposure start processing target row, and the feeding of the signal pCLK[2] is started. The signal p_clk[2] is used as an original signal of the signal pCLK[2].

According to the present exemplary embodiment, the vertical scan control unit 22 includes the selection generation unit 228. Further, the row driving units 35 each include the selection holding unit 356 and the pulse signal selection unit 357 and controls the cycle of the signal pCLK and the number of pulses for each frame. Thus, even in a case where there is a rapid change in luminance of an image capturing target, an exposure time can be set corresponding to the changed luminance. Even in a case where the luminance of the image capturing target decreases significantly, a decrease in brightness of captured images is prevented.

Next, a photoelectric conversion apparatus according to a fourth exemplary embodiment of the disclosure will be described below with reference to FIGS. 13, 14, 15, and 16, mainly differences from the first exemplary embodiment. The present exemplary embodiment is different from the first exemplary embodiment in the configuration of the control unit 20, the configuration of the vertical scan control unit 22, and the configuration of the vertical scan unit 30. The configuration according to the present exemplary embodiment can perform a global shutter operation in which the exposure periods of all the pixels P are simultaneously started and simultaneously ended.

[Control Unit 20]

Figure 13:
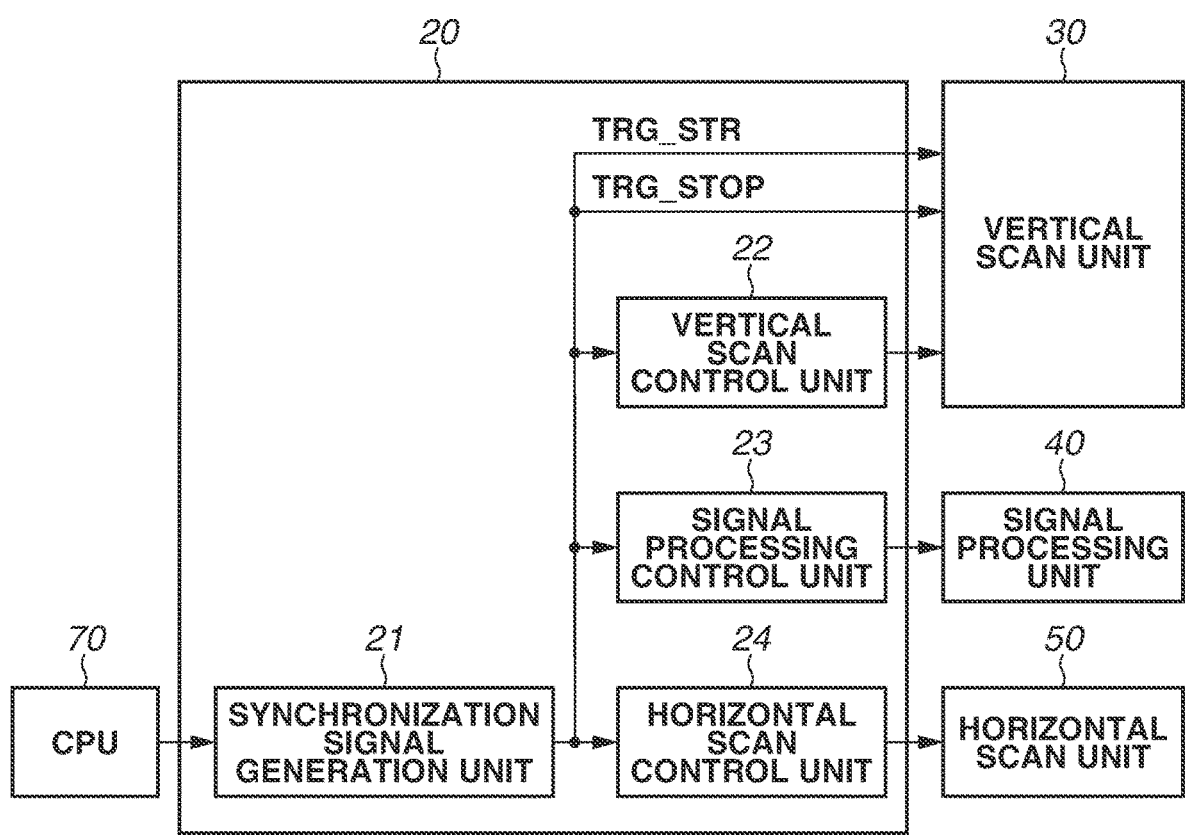
FIG. 13 is a diagram illustrating a configuration of a control unit.

FIG. 13 is a diagram illustrating a configuration of the control unit 20 according to the fourth exemplary embodiment. According to the present exemplary embodiment, the control unit 20 generates signals TRG_STR and TRG_STOP using the synchronization signal generation unit 21 and outputs the generated signals TRG_STR and TRG_STOP to the vertical scan unit 30. The signal TRG_STR is a trigger signal indicating a start of exposure and is commonly used for all the rows. The signal TRG_STOP is a trigger signal indicating an end of exposure and is commonly used for all the rows. The signals TRG_STR and TRG_STOP can be generated by the CPU 70.

[Vertical Scan Control Unit 22]

Figure 14:
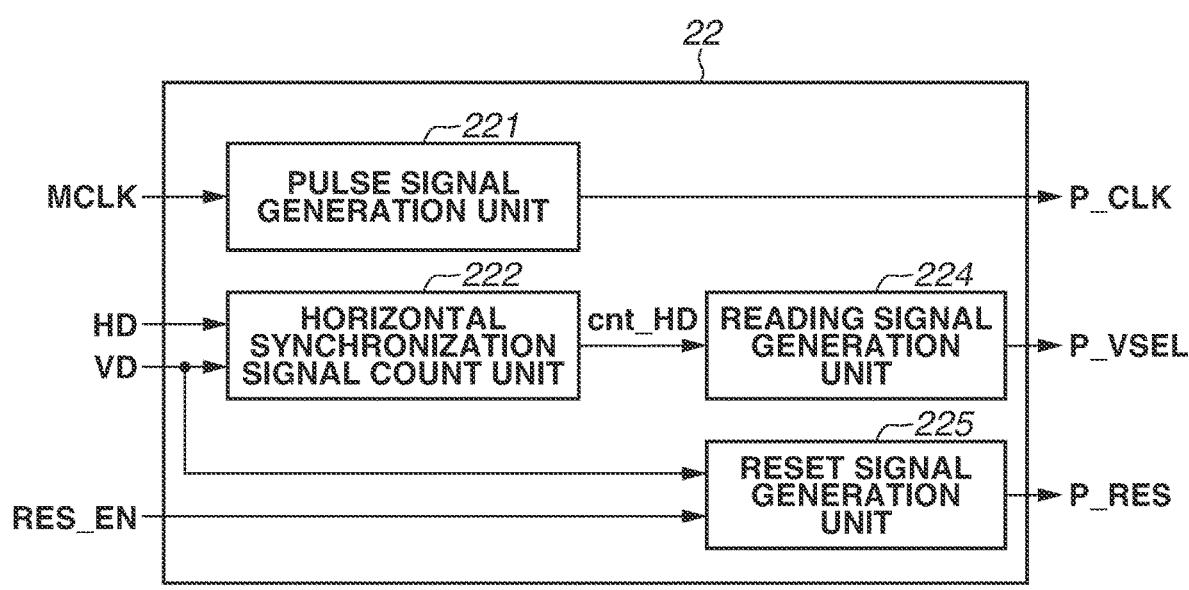
FIG. 14 is a diagram illustrating a configuration of a vertical scan control unit according to a fourth exemplary embodiment.

FIG. 14 is a diagram illustrating a configuration of the vertical scan control unit 22 according to the fourth exemplary embodiment. According to the present exemplary embodiment, the pulse count unit 223, the start trigger generation unit 226, and the end trigger generation unit 227 are not included in the vertical scan control unit 22.

Further, a signal RES_EN generated by the synchronization signal generation unit 21 is input to the vertical scan control unit 22. The signal RES_EN is a signal that permits generation of a signal P_RES, which is output from the reset signal generation unit 225. The signal P_RES is generated based on the vertical synchronization signal VD and the signal RES_EN and is commonly used for all the rows.

[Vertical Scan Unit 30]

Figure 15:
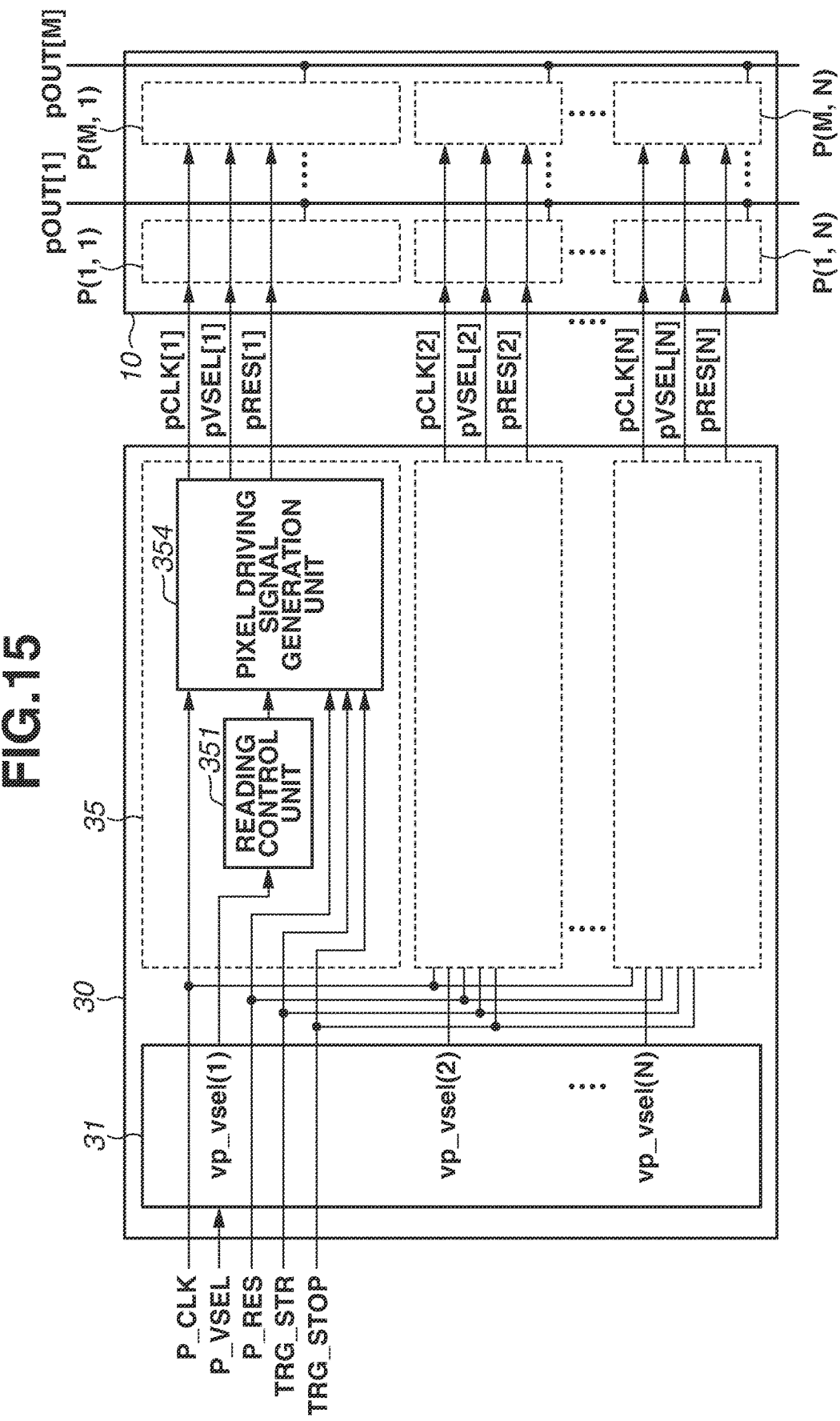
FIG. 15 is a diagram illustrating a configuration of a vertical scan unit according to the fourth exemplary embodiment.

FIG. 15 is a diagram illustrating a configuration of the vertical scan unit 30 according to the fourth exemplary embodiment. According to the present exemplary embodiment, the second decoder unit 32, the third decoder unit 33, and the fourth decoder unit 34 are not included in the vertical scan unit 30. Further, the exposure start control unit 352 and the exposure end control unit 353 are not included in the vertical scan unit 30.

[Operation of Pixel Driving Signal]

Figure 16:
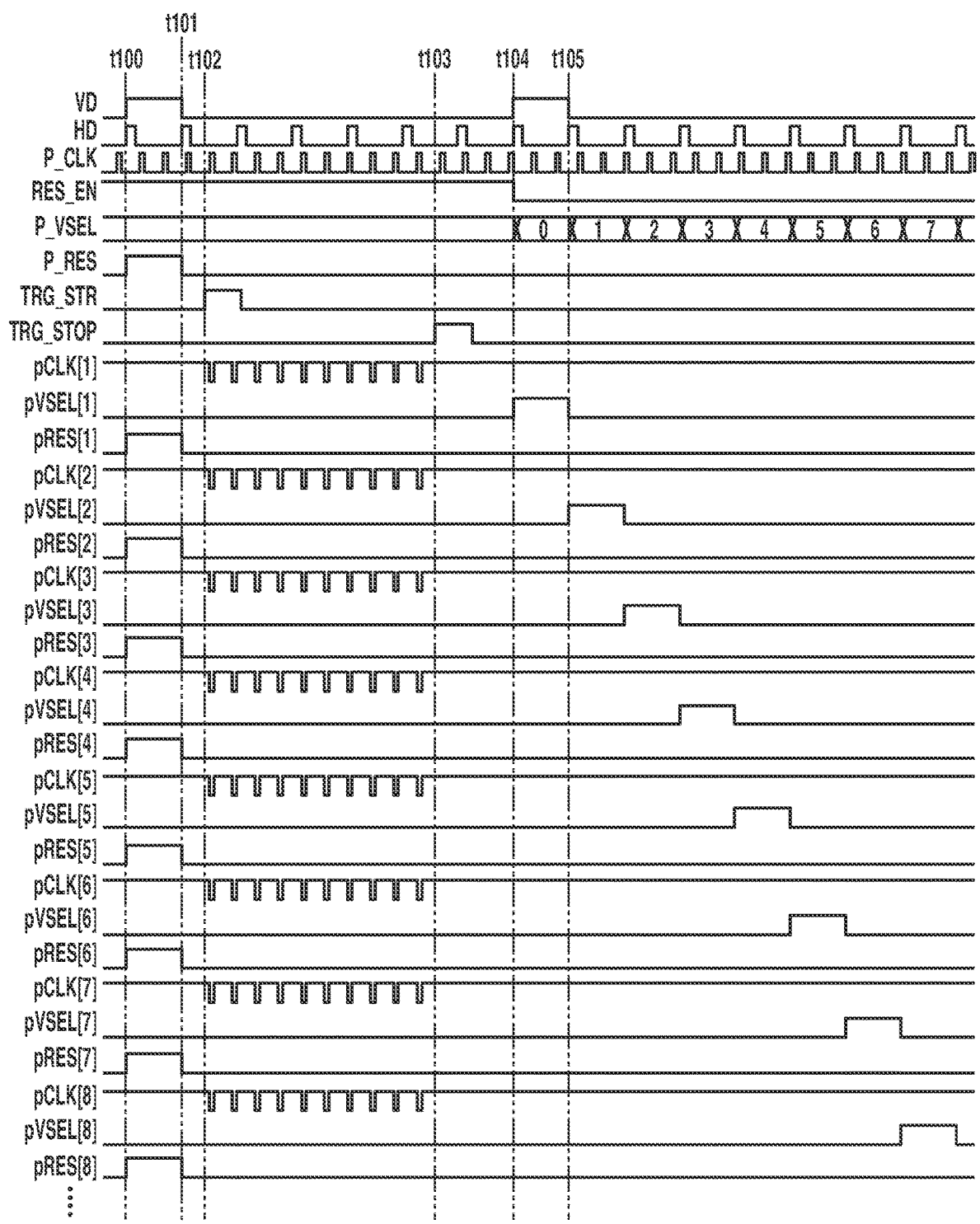
FIG. 16 is a timing chart illustrating pixel driving according to the fourth exemplary embodiment.

FIG. 16 is a timing chart illustrating an example of operations of the vertical scan control unit 22, the vertical scan unit 30, and the pixel unit 10 according to the fourth exemplary embodiment. The operations will be described below with reference to FIG. 16.

<Operation of Vertical Scan Control Unit 22>

At time t100, the vertical synchronization signal VD changes to the high level, and in a case where the signal RES_EN is at a high level, the signal P_RES changes to a high level based on the signal RES_EN being at the high level.

Further, at time tl01, once the vertical synchronization signal VD changes to the low level, the signal P_RES changes to a low level based on the change of the vertical synchronization signal VD to the low level.

The vertical synchronization signal VD does not necessarily need to be referred to in controlling timings at which the signal P_RES changes in level, and timings at which the signal P_RES changes in level can be controlled by referring to, for example, the counter value cnt_HD.

<Operation of Pixel Driving Signal>

At time t102, once the signal TRG_STR changes to a high level, the feeding of the signal pCLK to each of the rows is started.

At time t103, once the signal TRG_STOP changes to a high level, the feeding of the signal pCLK to each of the rows is ended.

At time t104, once the value of the signal P_VSEL changes to the value "0", the signal pVSEL[1] changes to the high level, and the first row of the pixel unit 10 becomes a reading processing target row. The signal pVSEL[1] controls the pixel output circuits 15 of the pixels P, and in a case where the signal pVSEL[1] is at the high level, the counters 14 are connected to the signal lines pOUT and read the count values.

At time t105, once the value of the signal P_VSEL changes to the value "1", the first row of the pixel unit 10 is no longer a reading processing target row, and the signal pVSEL[1] changes to the low level.

Further, at time t105, once the value of the signal P_VSEL changes to the value "1", the signal pVSEL[2] changes to a high level, and the second row of the pixel unit 10 becomes a reading processing target row.

Thereafter, the signal pVSEL sequentially changes to the high level and then changes to the low level similarly.

According to the present exemplary embodiment, the global shutter operation in which the exposure start processing and the exposure end processing are simultaneously performed on all the rows is performed. Thus, images without rolling-shutter distortions are obtained. Further, timings of the exposure start processing and the exposure end processing are controlled using another control signal different from the horizontal synchronization signal HD, and this enables precise control of the exposure time.

Next, a photoelectric conversion apparatus according to a fifth exemplary embodiment of the disclosure will be described below with reference to FIGS. 17, 18, 19, and 20, mainly differences from the fourth exemplary embodiment. The present exemplary embodiment is different from the fourth exemplary embodiment in the configuration of the control unit 20, the configuration of the vertical scan control unit 22, and the configuration of the vertical scan unit 30. A configuration according to the present exemplary embodiment can perform the global shutter operation.

[Control Unit 20]

Figure 17:
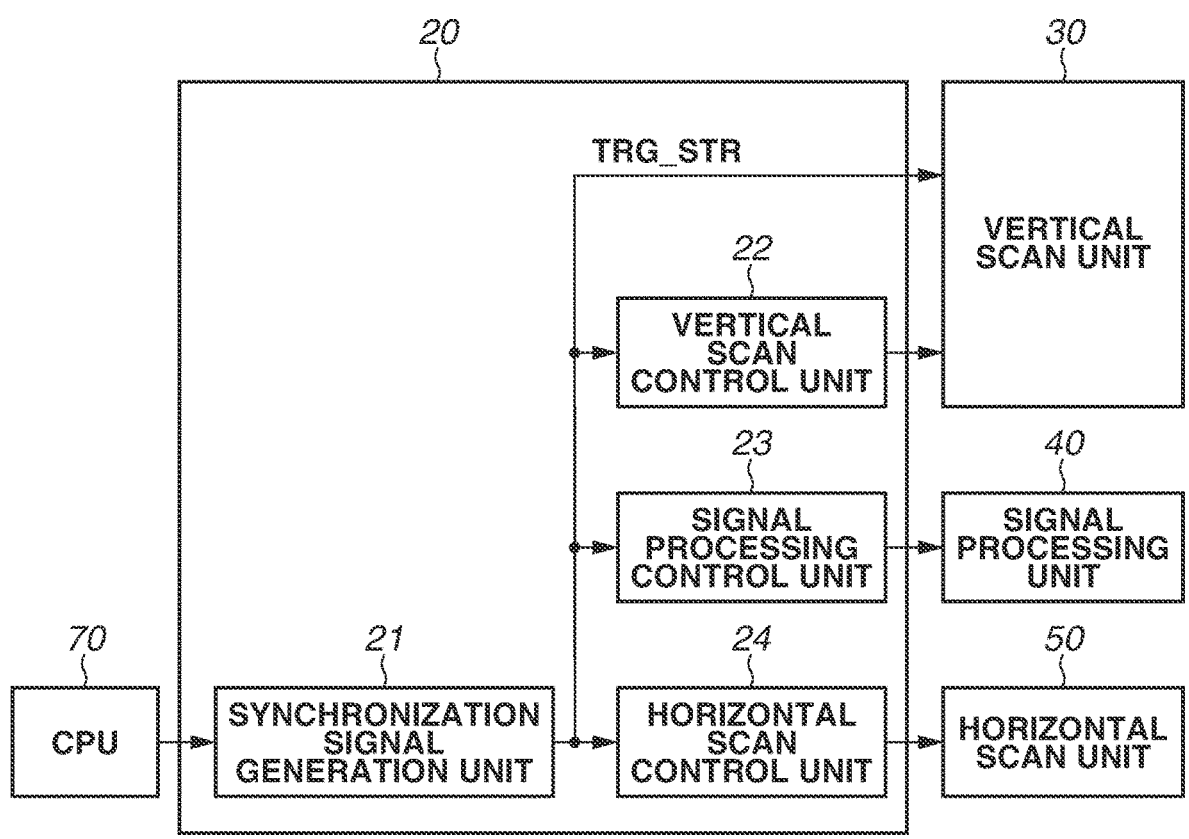
FIG. 17 is a diagram illustrating a configuration of a control unit according to a fifth exemplary embodiment.

FIG. 17 is a diagram illustrating a configuration of the control unit 20 according to the fifth exemplary embodiment. According to the present exemplary embodiment, the synchronization signal generation unit 21 of the control unit 20 does not generate the signal TRG_STOP.

[Vertical Scan Control 22]

Figure 18:
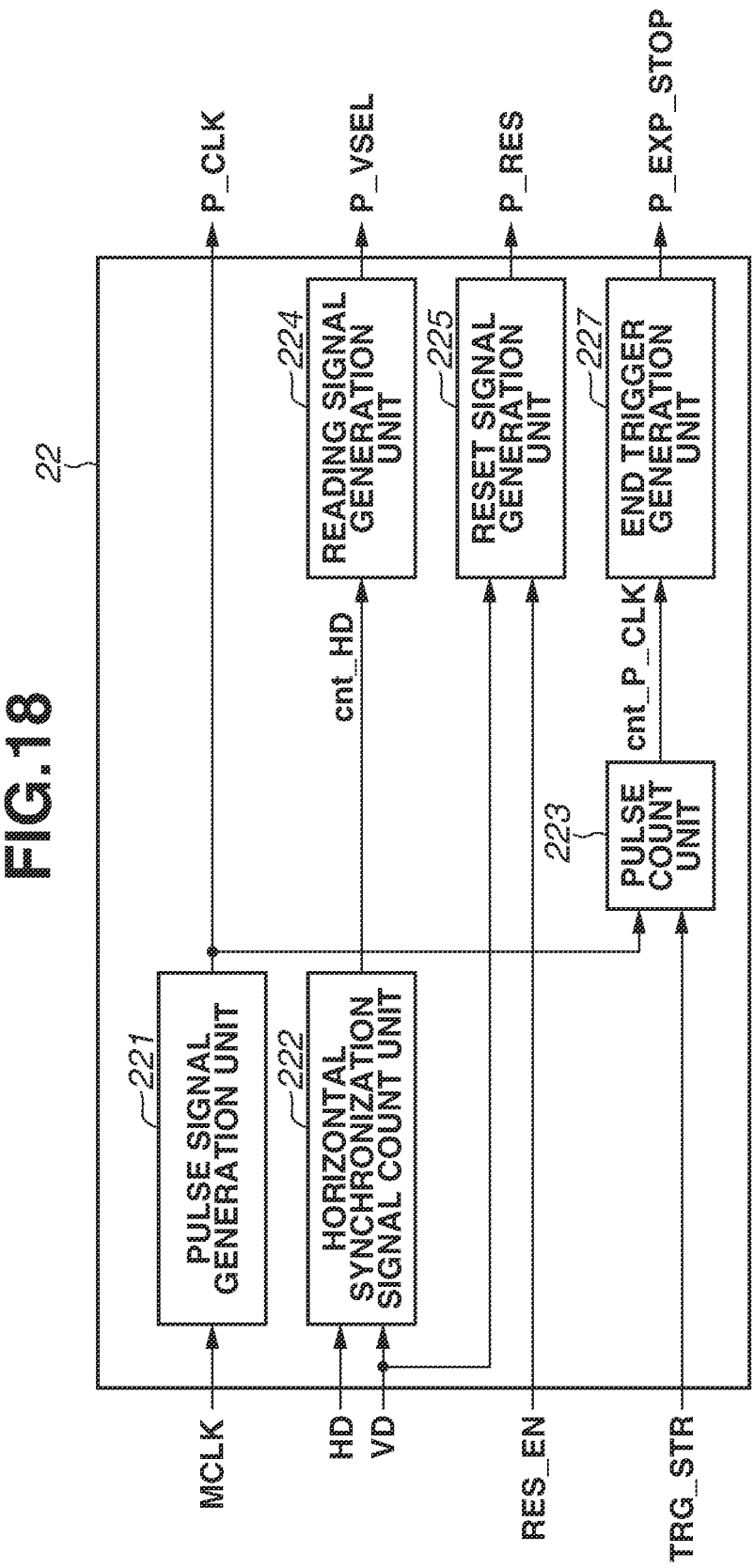
FIG. 18 is a diagram illustrating a configuration of a vertical scan control unit according to the fifth exemplary embodiment.

FIG. 18 is a diagram illustrating a configuration of the vertical scan control unit 22 according to the fifth exemplary embodiment. According to the present exemplary embodiment, the vertical scan control unit 22 includes the pulse count unit 223 and the end trigger generation unit 227.

The pulse count unit 223 receives the signals P_CLK and TRG_STR as input and outputs the count value cnt_P_CLK.

The signal P_EXP_STOP, which is output from the end trigger generation unit 227, is generated based on the count value cnt_P_CLK and is used commonly for all the rows.

[Vertical Scan Unit 30]

Figure 19:
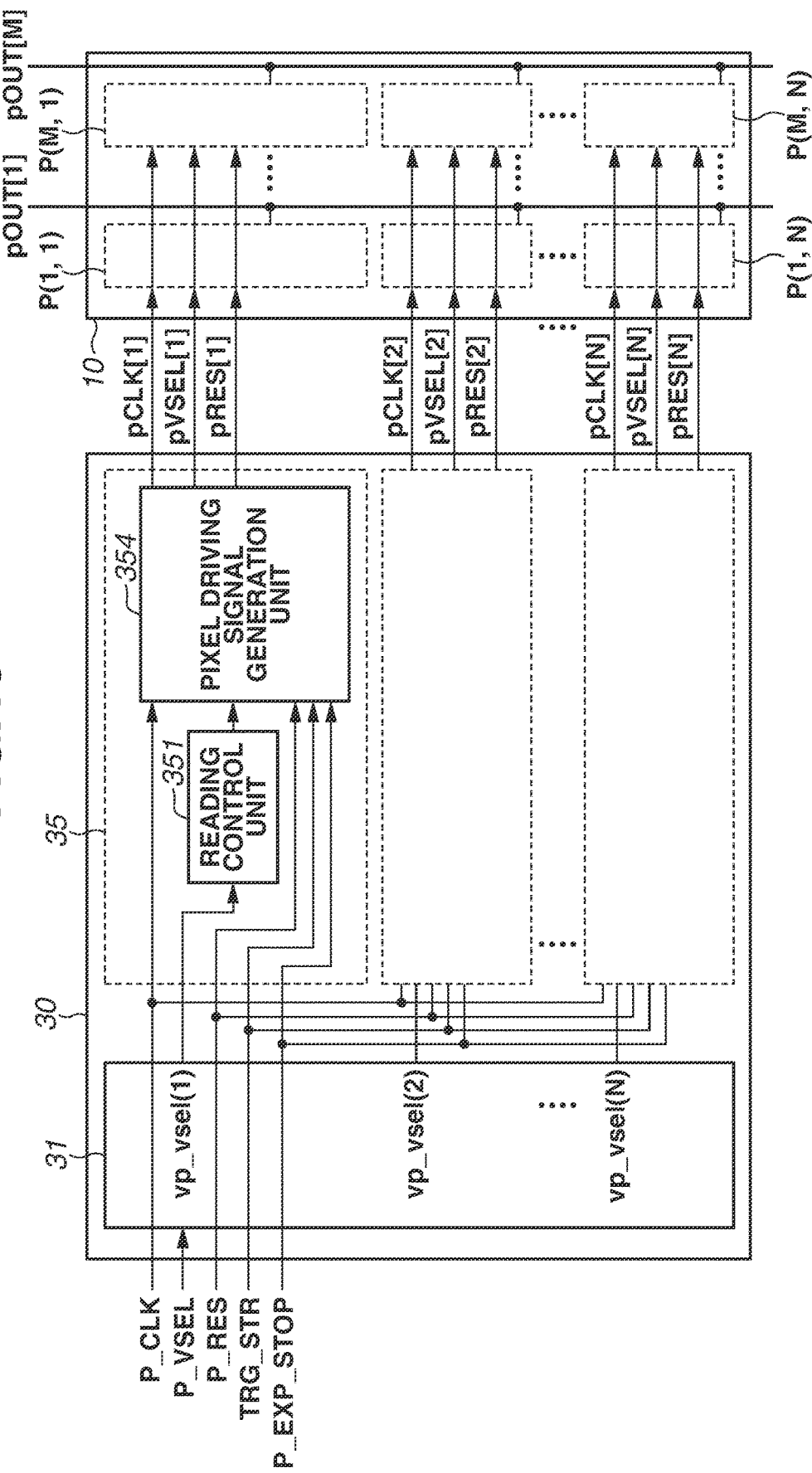
FIG. 19 is a diagram illustrating a configuration of a vertical scan unit according to the fifth exemplary embodiment.

FIG. 19 is a diagram illustrating a configuration of the vertical scan unit 30 according to the fifth exemplary embodiment. According to the present exemplary embodiment, the signal TRG_STOP is not input to the vertical scan unit 30, and the signal P_EXP_STOP is input to the vertical scan unit 30.

[Operation of Pixel Driving Signal]

Figure 20:
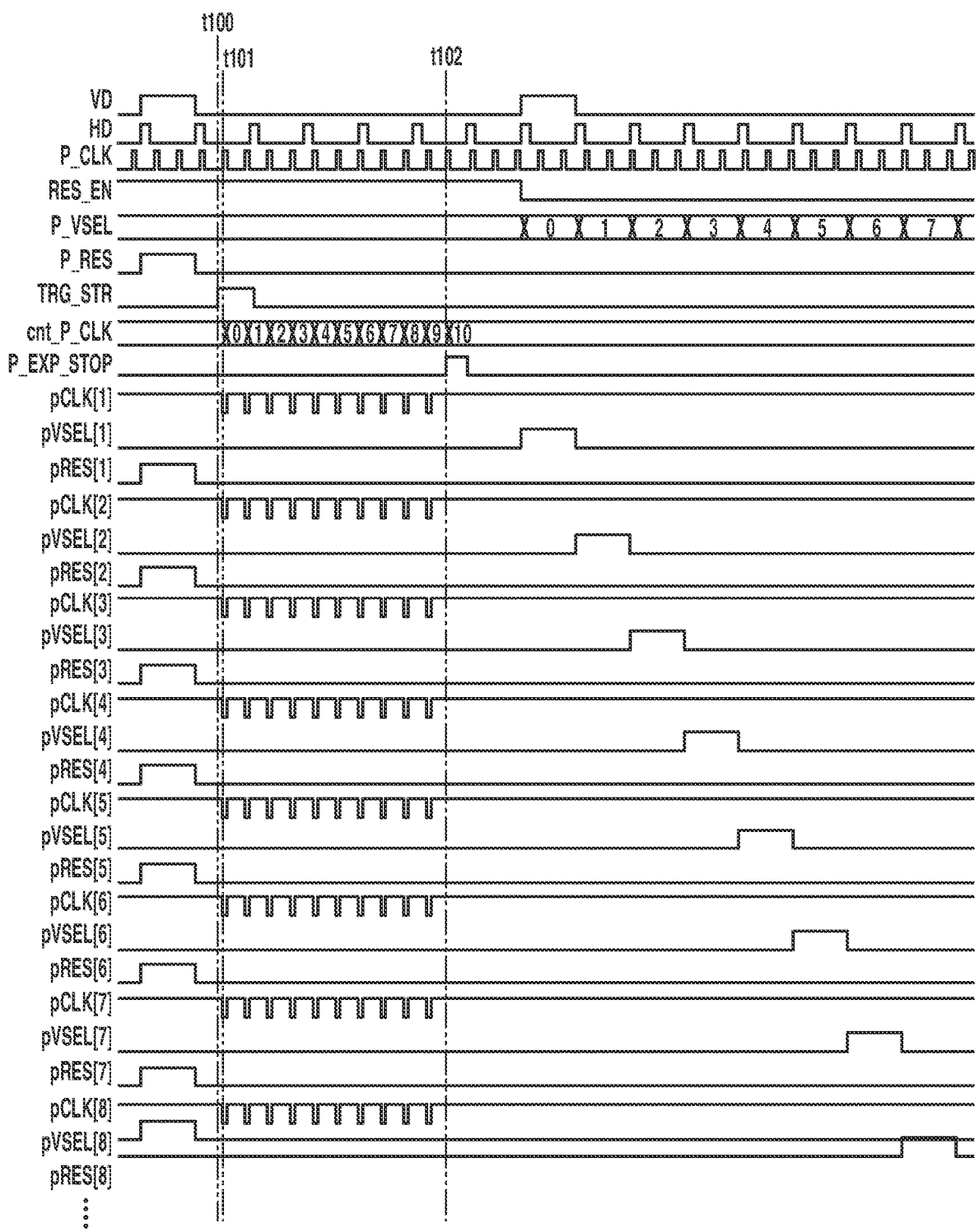
FIG. 20 is a timing chart illustrating pixel driving according to the fifth exemplary embodiment.

FIG. 20 is a timing chart illustrating an example of operations of the vertical scan control unit 22, the vertical scan unit 30, and the pixel unit 10 according to the fifth exemplary embodiment. The operations will be described below with reference to FIG. 20.

At time t100, once the signal TRG_STR changes to the high level, the feeding of the signal pCLK to each of the rows is started.

Further, at time t100, once the signal TRG_STR changes to the high level, the pulse count unit 223 starts counting the signals P_CLK.

At time t101, once the signal P_CLK changes to the high level, the value of the count value cnt_P_CLK changes to the value "0". The counter value cnt_P_CLK is incremented every time the signal P_CLK changes to the high level.

At time t102, once the value of the counter value cnt_P_CLK changes to the value "10", the signal P_EXP_STOP changes to a high level. Timings at which the signal P_EXP_STOP changes to the high level do not necessarily need to be timings at which the counter value cnt_P_CLK is the value "10" and can be controllable by a register.

At time t102, once the signal P_EXP_STOP changes to the high level, the feeding of the signal pCLK to the rows is ended.

The period from time t101 to time t102 is the exposure time of the rows of the pixel unit 10. Timings at which the signal P_EXP_STOP changes to the high level are controlled using the counter value cnt_P_CLK, and this enables control of the exposure time in units of one cycle of the signal P_CLK.

According to the present exemplary embodiment, the exposure of all the rows is started at a common timing and ended at a common timing, whereby still images without rolling-shutter distortions are captured. Further, exposure end timings are controlled using the count value cnt_P_CLK, and this enables management of the exposure time using the number of signals P_CLK and facilitates control.

Next, a photoelectric conversion apparatus according to a sixth exemplary embodiment of the disclosure will be described below with reference to FIGS. 21, 22, and 23, mainly differences from the fifth exemplary embodiment. The present exemplary embodiment is different from the fifth exemplary embodiment in the configuration of the vertical scan control unit 22 and the configuration of the vertical scan unit 30.

[Vertical Scan Control Unit 22]

Figure 21:
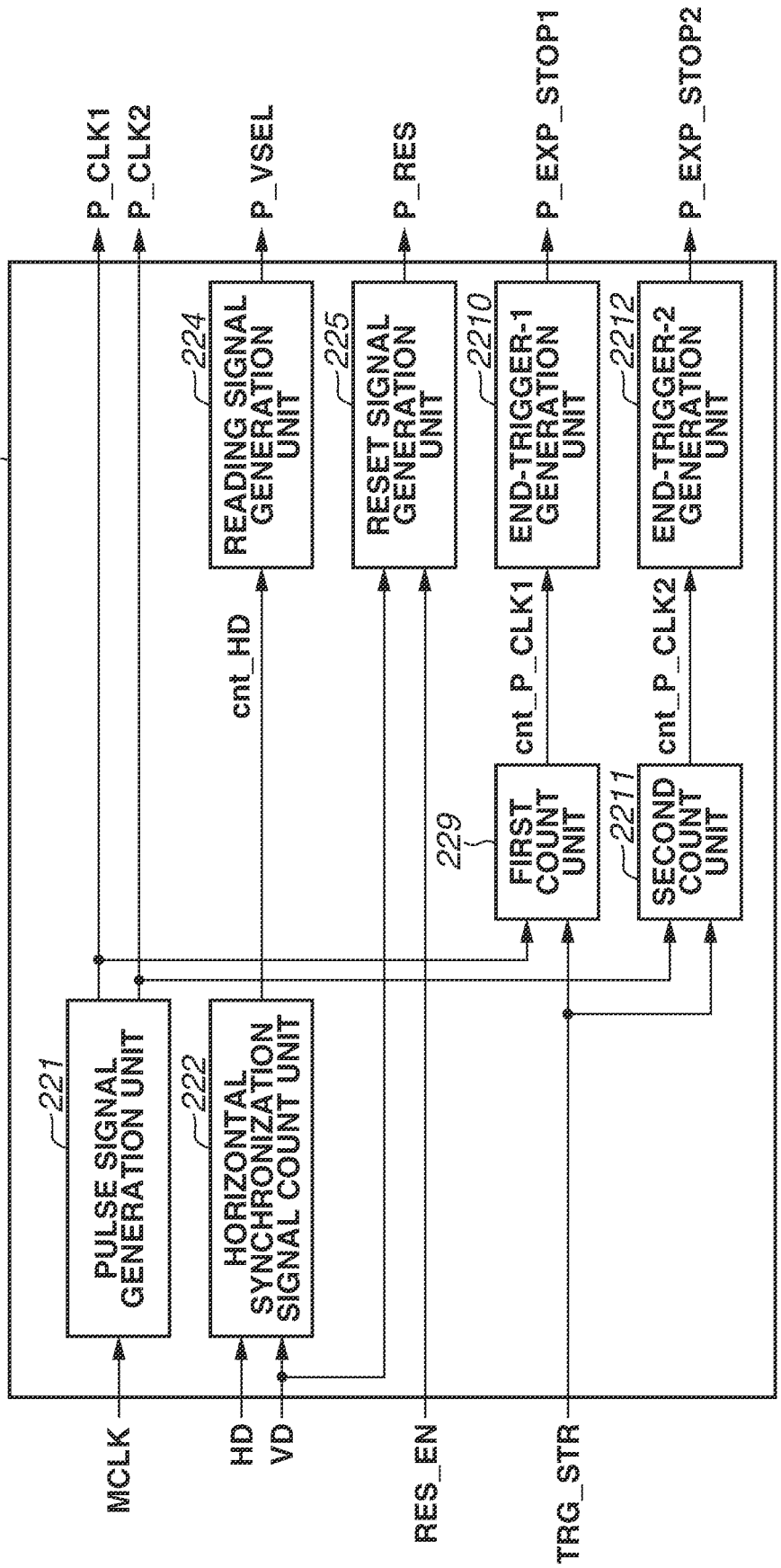
FIG. 21 is a diagram illustrating a configuration of a vertical scan control unit according to a sixth exemplary embodiment.

FIG. 21 is a diagram illustrating a configuration of the vertical scan control unit 22 according to the sixth exemplary embodiment.

According to the present exemplary embodiment, the pulse signal generation unit 221 in the vertical scan control unit 22 generates the signal P_CLK1 and the signal P_CLK2 having the same cycle as a cycle of the signal P_CLK1 and having a different phase from a phase of the signal P_CLK1.

Further, the vertical scan control unit 22 includes a first count unit 229, an end-trigger-1 generation unit 2210, a second count unit 2211, and an end-trigger-2 generation unit 2212.

The signals P_CLK1 and TRG_STR are input to the first count unit 229, and the first count unit 229 outputs the count value cnt_P_CLK1 (first count value). The signals P_CLK2 and TRG_STR are input to the second count unit 2211, and the second count unit 2211 outputs the count value cnt_P_CLK2 (second count value).

The signal P_EXP_STOP1, which is output from the end-trigger-1 generation unit 2210, is generated based on the count value cnt_P_CLK1. The signal P_EXP_STOP2, which is output from the end-trigger-2 generation unit 2212, is generated based on the count value cnt_P_CLK2.

The configuration can be changed as needed to change the number of signals P_CLK to three or more.

[Vertical Scan Unit 30]

Figure 22:
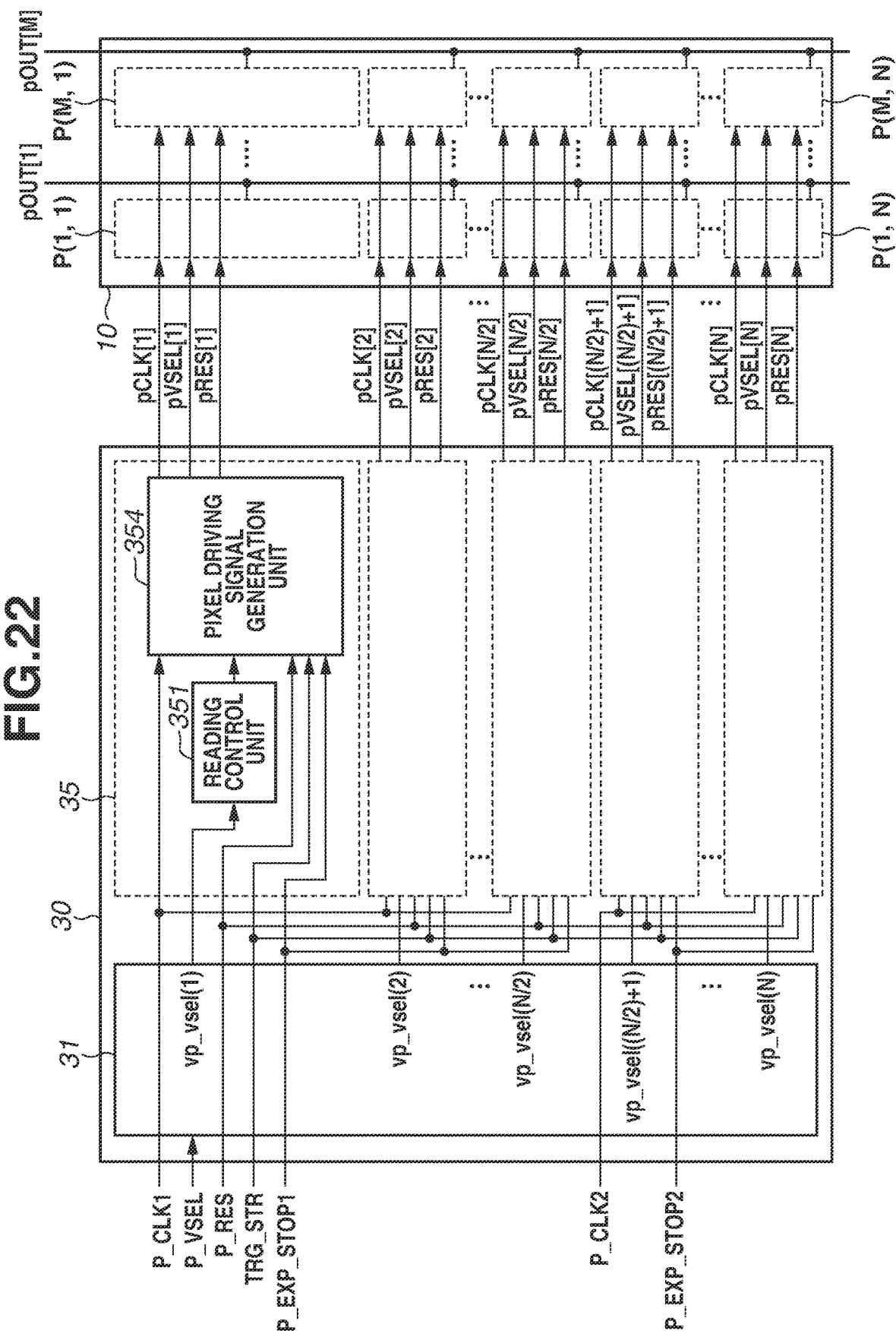
FIG. 22 is a diagram illustrating a configuration of a vertical scan unit according to the sixth exemplary embodiment.

FIG. 22 is a diagram illustrating a configuration of the vertical scan unit 30 according to the sixth exemplary embodiment. According to the present exemplary embodiment, the signal P_CLK is not input to the vertical scan unit 30. Further, the signals P_CLK1 and P_CLK2 are input to the vertical scan unit 30. Further, the signal P_EXP_STOP is not input to the vertical scan unit 30. Further, the signals P_EXP_STOP1 and P_EXP_STOP2 are input to the vertical scan unit 30.

The signals P_CLK1 and P_EXP_STOP1 are used by the row driving units 35 corresponding to the first to (N/2)th rows of the pixel unit 10. Further, the signals P_CLK2 and P_EXP_STOP2 are used by the row driving units 35 corresponding to the ((N/2)+1)th to Nth rows of the pixel unit 10. A method for assigning the signals for use in the row driving units 35 is not limited to the foregoing method. For example, different signals can be used repeatedly for every single row, every two rows, or irregularly, or can be controllable by a register.

[Operation of Pixel Driving Signal]

Figure 23:
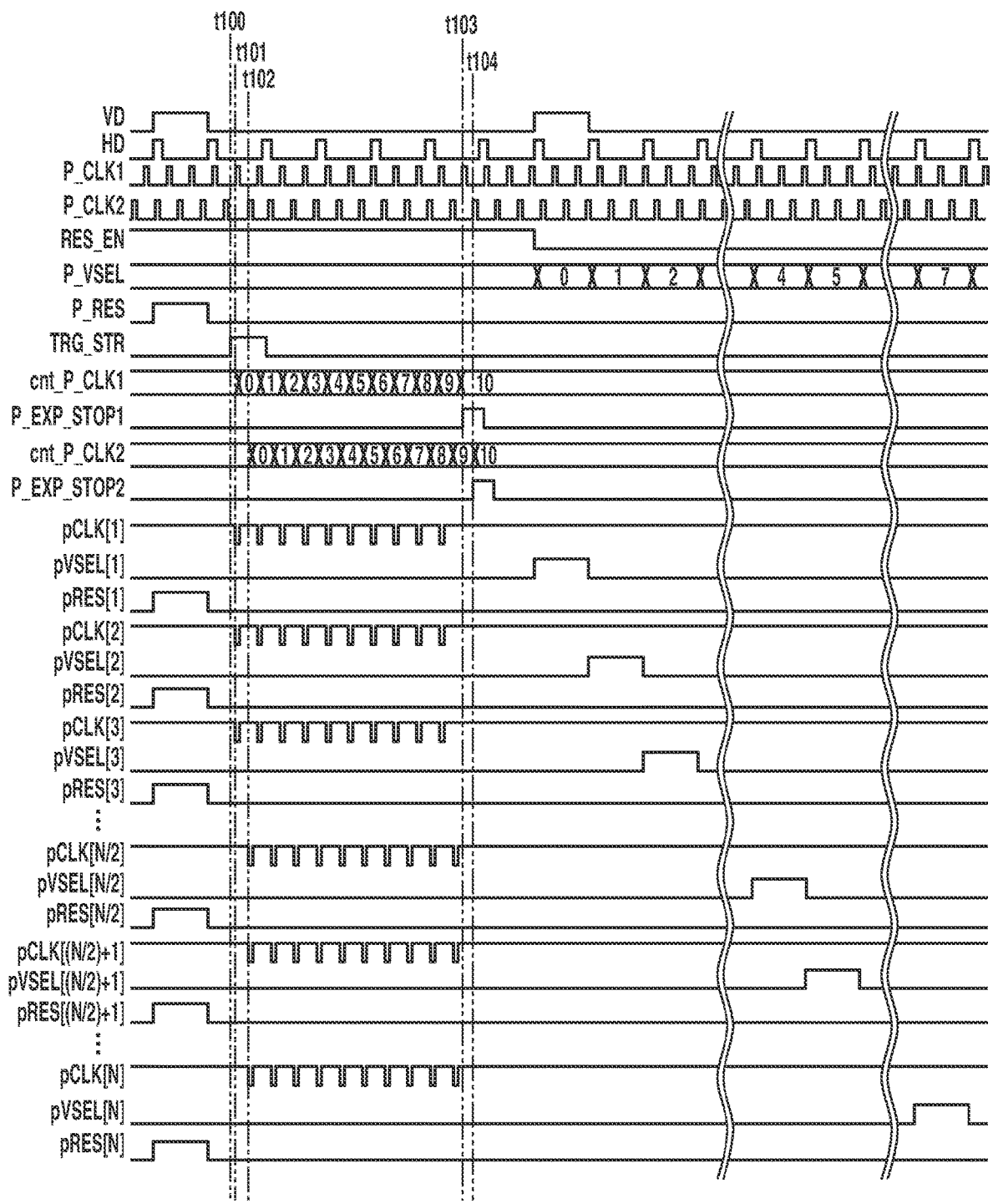
FIG. 23 is a timing chart illustrating pixel driving according to the sixth exemplary embodiment.

FIG. 23 is a timing chart illustrating an example of operations of the vertical scan control unit 22, the vertical scan unit 30, and the pixel unit 10 according to the sixth exemplary embodiment. The operations will be described below with reference to FIG. 23.

At time t100, once the signal TRG_STR changes to the high level, the feeding of the signal pCLK to each of the rows is started. The signal P_CLK1 is used as an original signal of the signal pCLK corresponding to the first to (N/2)th rows of the pixel unit 10, and the signal P_CLK2 is used as an original signal of the signal pCLK corresponding to the ((N/2)+1)th to Nth rows of the pixel unit 10.

Further, at time t100, once the signal TRG_STR changes to the high level, the first count unit 229 and the second count unit 2211 start counting the signals P_CLK1 and P_CLK2.

At time t101, once the signal P_CLK1 changes to a high level, the value of the count value cnt_P_CLK1 changes to the value "0". The counter value cnt_P_CLK1 is incremented every time the signal P_CLK1 changes to the high level.

At time t102, once the signal P_CLK2 changes to a high level, the value of the count value cnt_P_CLK2 changes to the value "0". The counter value cnt_P_CLK2 is incremented every time the signal P_CLK2 changes to the high level.

At time t103, once the value of the counter value cnt_P_CLK1 changes to the value "10", the signal P_EXP_STOP1 changes to a high level. Timings at which the signal P_EXP_STOP1 changes to the high level do not necessarily need to be timings at which the counter value cnt_P_CLK1 is the value "10" and can be controllable by a register.

At time t103, once the signal P_EXP_STOP1 changes to the high level, the feeding of the signal pCLK corresponding to the first to (N/2)th rows of the pixel unit 10 is ended.

At time t104, once the value of the counter value cnt_P_CLK2 changes to the value "10", the signal P_EXP_STOP2 changes to a high level. Timings at which the signal P_EXP_STOP2 changes to the high level do not necessarily need to be timings at which the counter value cnt_P_CLK2 is the value "10" and can be controllable by a register.

At time t104, once the signal P_EXP_STOP2 changes to the high level, the feeding of the signal pCLK corresponding to the ((N/2)+1)th to Nth rows of the pixel unit 10 is ended.

A plurality of phases of the signal pCLK to be fed to the pixels P is prepared. This prevents an instantaneous increase in current that occurs in a power system of the photoelectric conversion apparatus due to avalanche multiplication operation. Thus, circuit operations of the photoelectric conversion apparatus are further stabilized.

According to the present exemplary embodiment, the exposure of all the rows is started at a common timing and ended at a common timing, whereby the global shutter operation is performed. Thus, images without rolling-shutter distortions are obtained. Further, the plurality of different phrases of the signal P_CLK for use in generating the signal pCLK is prepared, whereby an instantaneous increase in current in the power system is prevented. This stabilizes the power system of the photoelectric conversion apparatus, so that the circuit operations of the photoelectric conversion apparatus are further stabilized.

Next, a photoelectric conversion apparatus according to a seventh exemplary embodiment of the disclosure will be described below with reference to FIGS. 24, 25, and 26, mainly differences from the sixth exemplary embodiment. The present exemplary embodiment is different from the sixth exemplary embodiment in the configuration of the vertical scan control unit 22 and the configuration of the vertical scan unit 30.

[Vertical Scan Control Unit 22]

Figure 24:
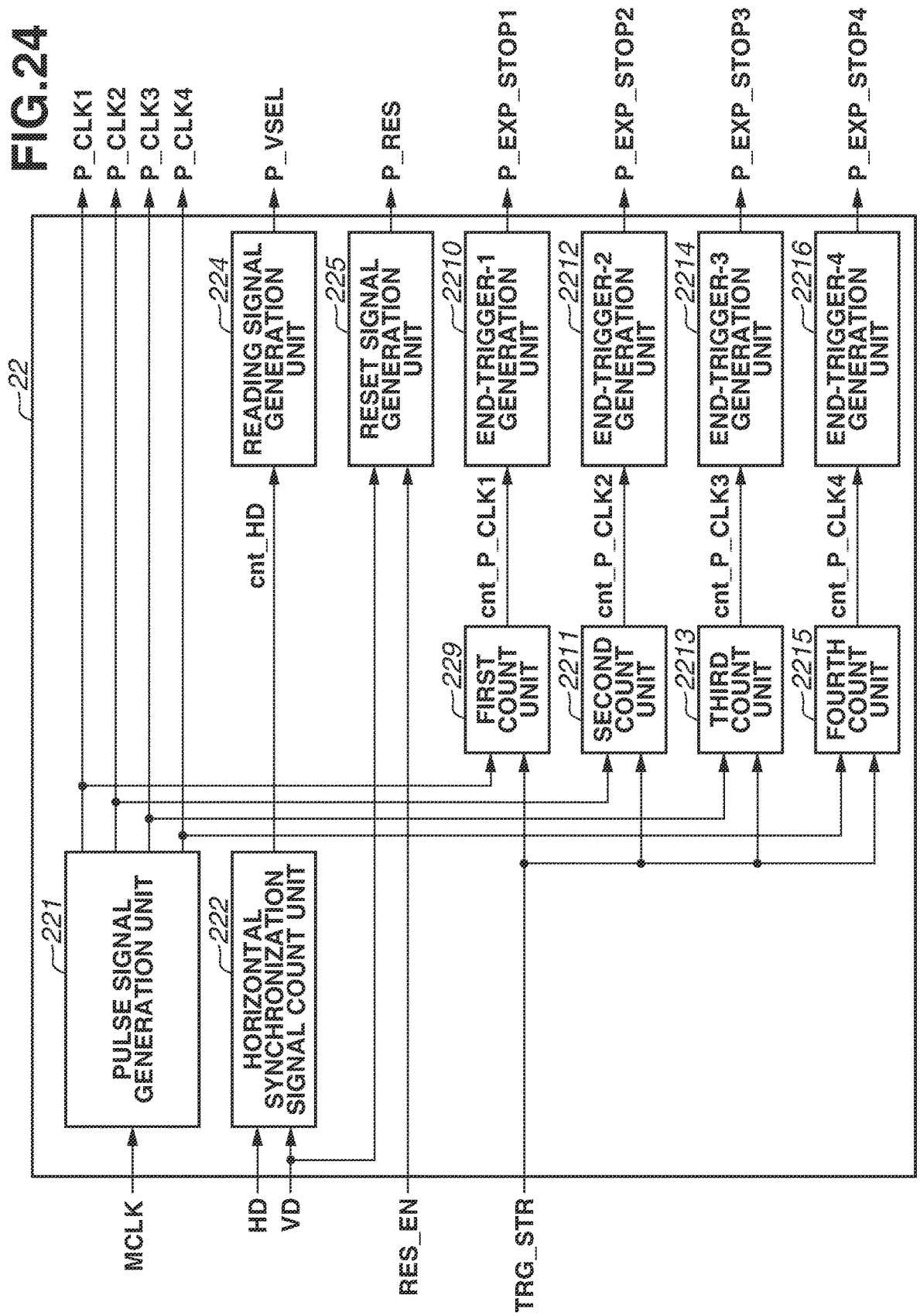
FIG. 24 is a diagram illustrating a configuration of a vertical scan control unit according to a seventh exemplary embodiment.

FIG. 24 is a diagram illustrating a configuration of the vertical scan control unit 22 according to the seventh exemplary embodiment.

According to the present exemplary embodiment, the pulse signal generation unit 221 in the vertical scan control unit 22 generates the signals P_CLK1, P_CLK2, P_CLK3, and P_CLK4. Cycles of the signals P_CLK1, P_CLK2, P_CLK3, and P_CLK4 can be controlled in units of one cycle of the clock MCLK and can be different from each other.

Further, the vertical scan control unit 22 includes the first count unit 229, the end-trigger-1 generation unit 2210, and the second count unit 2211. The vertical scan control unit 22 further includes the end-trigger-2 generation unit 2212, a third count unit 2213, an end-trigger-3 generation unit 2214, a fourth count unit 2215, and an end-trigger-4 generation unit 2216.

The signals P_CLK1 and TRG_STR are input to the first count unit 229, and the first count unit 229 outputs the count value cnt_P_CLK1. The signals P_CLK2 and TRG_STR are input to the second count unit 2211, and the second count unit 2211 outputs the count value cnt_P_CLK2.

The signals P_CLK3 and TRG_STR are input to the third count unit 2213, and the third count unit 2213 outputs the count value cnt_P_CLK3. The signals P_CLK4 and TRG_STR are input to the fourth count unit 2215, and the fourth count unit 2215 outputs the count value cnt_P_CLK4.

The signal P_EXP_STOP1 output from the end-trigger-1 generation unit 2210 is generated based on the count value cnt_P_CLK1. The signal P_EXP_STOP2 output from the end-trigger-2 generation unit 2212 is generated based on the count value cnt_P_CLK2. The signal P_EXP_STOP3 output from the end-trigger-3 generation unit 2214 is generated based on the count value cnt_P_CLK3. The signal P_EXP_STOP4 output from the end-trigger-4 generation unit 2216 is generated based on the count value cnt_P_CLK4.

The configuration can be changed as needed to change the number of the signals P_CLK to five or more.

[Vertical Scan Unit 30]

Figure 25:
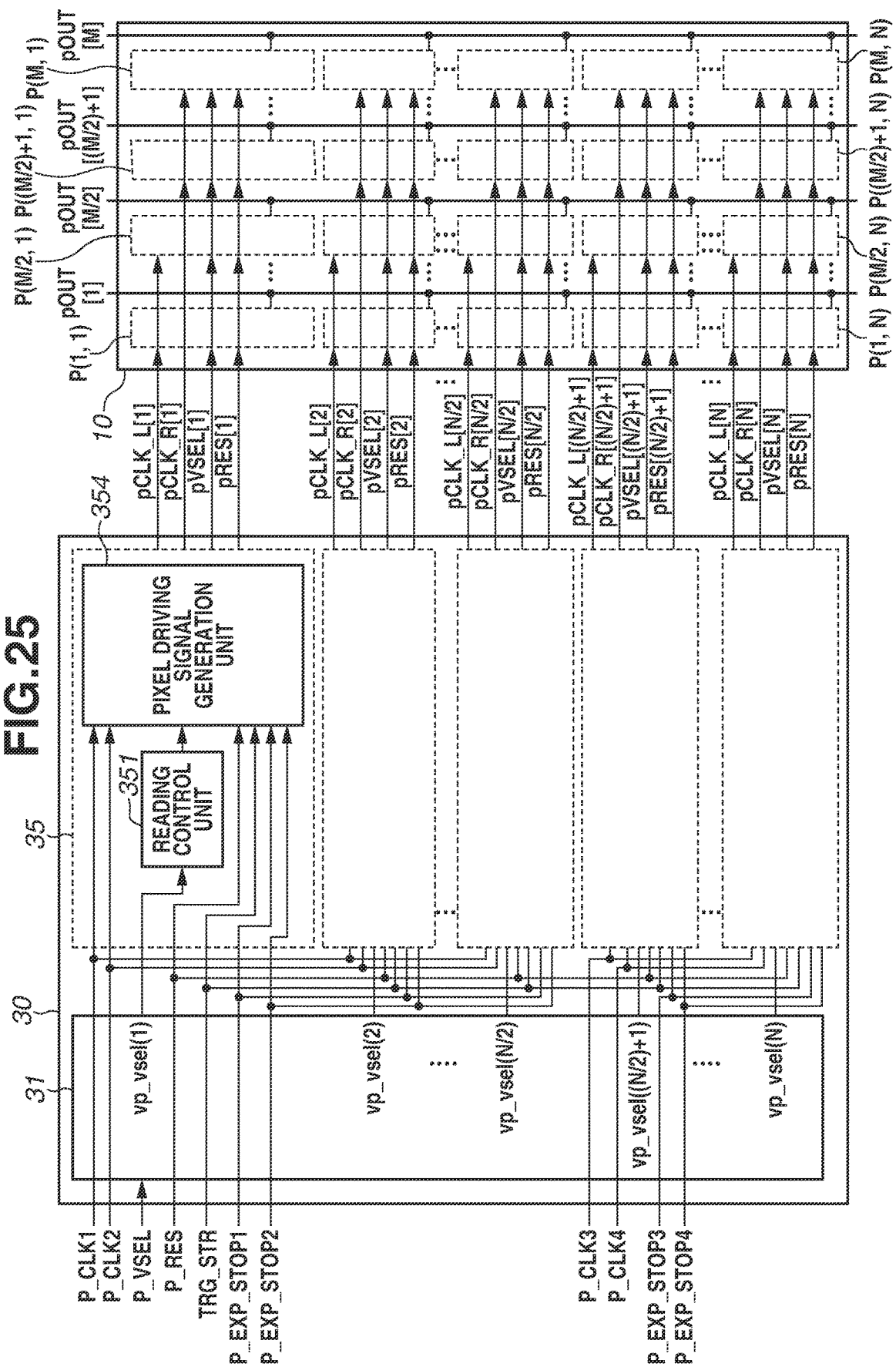
FIG. 25 is a diagram illustrating a configuration of a vertical scan unit according to the seventh exemplary embodiment.

FIG. 25 is a diagram illustrating a configuration of the vertical scan unit 30 according to the seventh exemplary embodiment. According to the present exemplary embodiment, the signal P_CLK is not input to the vertical scan unit 30. Further, the signals P_CLK1, P_CLK2, P_CLK3, and P_CLK4 are input to the vertical scan unit 30. Further, the signal P_EXP_STOP is not input to the vertical scan unit 30. Further, the signals P_EXP_STOP1, P_EXP_STOP2, P_EXP_STOP3, and P_EXP_STOP4 are input to the vertical scan unit 30.

The signals P_CLK1, P_CLK2, P_EXP_STOP1, and P_EXP_STOP2 are used by the row driving units 35 corresponding to the first to (N/2)th rows of the pixel unit 10. Further, the signal P_CLK1 is used as an original signal of the signal pCLK_L, and the signal P_CLK2 is used as an original signal of the signal pCLK_R.

The signals P_CLK3, P_CLK4, P_EXP_STOP3, and P_EXP_STOP4 are used by the row driving units 35 corresponding to the ((N/2)+1)th to Nth rows of the pixel unit 10. Further, the signal P_CLK3 is used as an original signal of the signal pCLK_L, and the signal P_CLK4 is used as an original signal of the signal pCLK_R.

A method for assigning the signals for use in the row driving units 35 is not limited to the foregoing method. For example, different signals can be used repeatedly for every single row, every two rows, or irregularly, or can be controllable by a register.

The signal pCLK_L is fed to the first to (M/2)th columns of the pixel unit 10, and the signal pCLK_R is fed to the ((M/2)+1)th to Mth columns of the pixel unit 10.

A method for assigning the signal pCLK is not limited to the foregoing method. For example, different signals can be used repeatedly for every single row, every two rows, or irregularly, or can be controllable by a register.

[Operation of Pixel Driving Signal]

Figure 26:
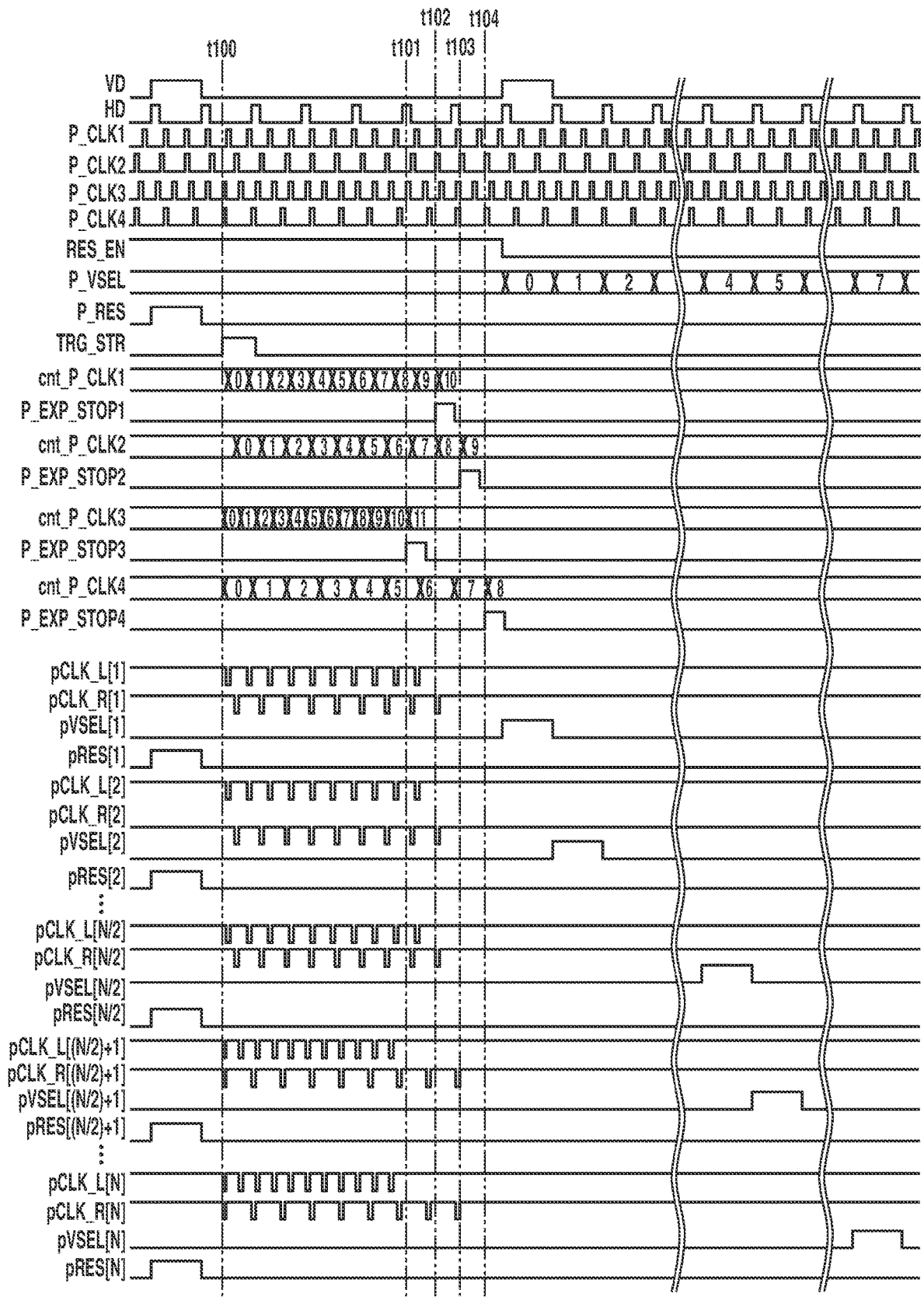
FIG. 26 is a timing chart illustrating pixel driving according to the seventh exemplary embodiment.

FIG. 26 is a timing chart illustrating an example of operations of the vertical scan control unit 22, the vertical scan unit 30, and the pixel unit 10 according to the seventh exemplary embodiment. The operations will be described below with reference to FIG. 26.

At time t100, once the signal TRG_STR changes to the high level, the feeding of the signals pCLK_L and pCLK_R to the rows is started.

Further, at time t100, the signal TRG_STR changes to the high level. Consequently, the first count unit 229, the second count unit 2211, the third count unit 2213, and the fourth count unit 2215 start counting the signals P_CLK1, P_CLK2, P_CLK3, and P_CLK4. The first count unit 229, the second count unit 2211, the third count unit 2213, and the fourth count unit 2215 generate a first count value, a second count value, a third count value, and a fourth count value, respectively.

At time t101, once the value of the counter value cnt_P_CLK3 changes to the value "11", the signal P_EXP_STOP3 changes to a high level. Timings at which the signal P_EXP_STOP3 changes to the high level do not necessarily need to be timings at which the counter value cnt_P_CLK3 is the value "11" and can be controllable by a register.

At time t101, once the signal P_EXP_STOP3 changes to the high level, the feeding of the signal pCLK_L to the ((N/2)+1)th to Nth rows of the pixel unit 10 is ended.

At time t102, once the value of the counter value cnt_P_CLK1 changes to the value "10", the signal P_EXP_STOP1 changes to the high level. Timings at which the signal P_EXP_STOP1 changes to the high level do not necessarily need to be timings at which the value of the counter value cnt_P_CLK1 is the value "10" and can be controllable by a register.

At time t102, once the signal P_EXP_STOP1 changes to the high level, the feeding of the signal pCLK_L to the first to (N/2)th rows of the pixel unit 10 is ended.

At time t103, once the value of the counter value cnt_P_CLK2 changes to the value "9", the signal P_EXP_STOP2 changes to the high level. Timings at which the signal P_EXP_STOP2 changes to the high level do not necessarily need to be timings at which the counter value cnt_P_CLK2 is the value "9" and can be controllable by a register.

At time t103, once the signal P_EXP_STOP2 changes to the high level, the feeding of the signal pCLK_R to the first to (N/2)th rows of the pixel unit 10 is ended.

At time t104, once the value of the counter value cnt_P_CLK4 changes to the value "8", the signal P_EXP_STOP4 changes to a high level. Timings at which the signal P_EXP_STOP4 changes to the high level do not necessarily need to be timings at which the counter value cnt_P_CLK4 is the value "8" and can be controllable by a register.

At time t104, once the signal P_EXP_STOP4 changes to the high level, the feeding of the signal pCLK_R to the ((N/2)+1)th to Nth rows of the pixel unit 10 is ended.

Timings at which the signal P_EXP_STOP changes to the high level are controlled using the counter value cnt_P_CLK, and this enables control of the exposure time of each region controlled by the signal pCLK individually in units of one cycle of the signal P_CLK.

According to the present exemplary embodiment, the exposure of all the rows is started at a common timing and ended at a common timing, whereby the global shutter operation is performed. Thus, images without rolling-shutter distortions are obtained. Further, the plurality of signals pCLK is prepared, and the cycle and number of times of each signal pCLK are controlled individually, whereby a different exposure time is settable for each region to which the signal pCLK is fed. Thus, an exposure time of a suitable length for each region is settable even in a case where an image capturing target includes regions that are different in brightness or darkness from each other.

Figure 27:
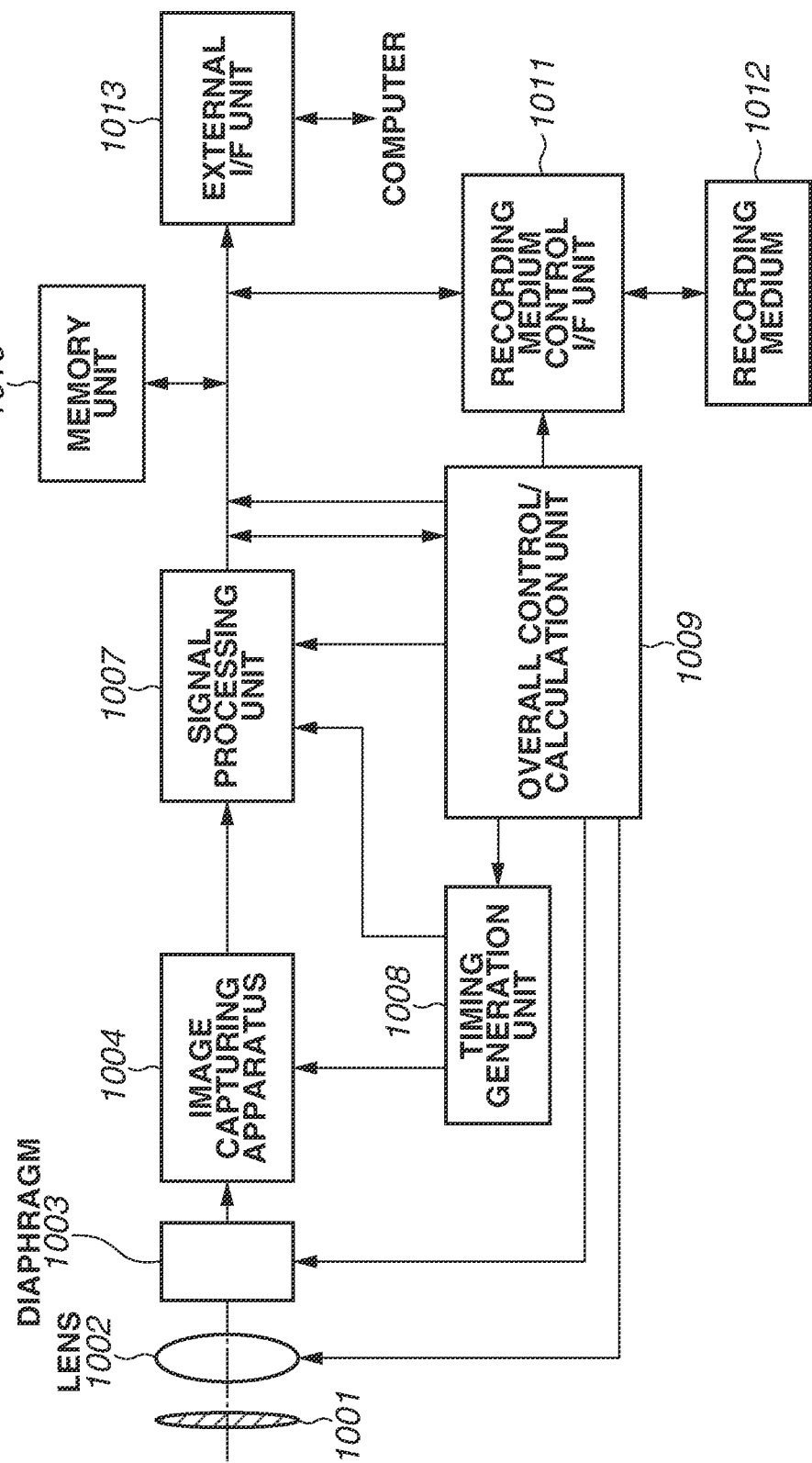
FIG. 27 is a diagram illustrating a configuration of a photoelectric conversion system according to an eighth exemplary embodiment.

A photoelectric conversion system according to an eighth exemplary embodiment will be described below with reference to FIG. 27. FIG. 27 is a block diagram illustrating a schematic configuration of a photoelectric conversion system according to the present exemplary embodiment.

The image capturing apparatuses according to the first to seventh exemplary embodiments are applicable to various photoelectric conversion systems. Examples of applicable photoelectric conversion systems are digital still cameras, digital camcorders, surveillance cameras, copy machines, facsimiles, mobile phones, in-vehicle cameras, and observation satellites. Further, examples of photoelectric conversion systems also include camera modules including an optical system such as a lens and an image capturing apparatus. FIG. 27 is a block diagram illustrating a digital still camera as an example.

The photoelectric conversion system illustrated as an example in FIG. 27 includes an image capturing apparatus 1004, a lens 1002, a diaphragm 1003, and a barrier 1001. The lens 1002 forms an optical image of a subject on the image capturing apparatus 1004. The diaphragm 1003 changes the amount of light that passes through the lens 1002. The barrier 1001 protects the lens 1002. The lens 1002 and the diaphragm 1003 constitute an optical system that converges light to the image capturing apparatus 1004. The image capturing apparatus 1004 is a photoelectric conversion apparatus (image capturing apparatus) according to one of the above-described exemplary embodiments and converts an optical image formed by the lens 1002 into an electric signal.

The photoelectric conversion system further includes a signal processing unit 1007. The signal processing unit 1007 is an image generation unit that generates an image by processing an output signal that is output from the image capturing apparatus 1004. The signal processing unit 1007 performs various types of correction and compression as needed and outputs the resulting image data. The signal processing unit 1007 can be formed on a semiconductor substrate on which the image capturing apparatus 1004 is formed or can be formed on another semiconductor substrate different from the semiconductor substrate on which the image capturing apparatus 1004 is formed. Further, the image capturing apparatus 1004 and the signal processing unit 1007 can be formed on the same semiconductor substrate.

The photoelectric conversion system further includes a memory unit 1010 and an external interface unit (external I/F unit) 1013. The memory unit 1010 temporarily stores image data. The external I/F unit 1013 is used to communicate with an external computer. Further, the photoelectric conversion system includes a recording medium 1012 such as a semiconductor memory for recording or reading captured data and a recording medium control interface unit (recording medium control I/F unit) 1011 for recording on and reading from the recording medium 1012. The recording medium 1012 can be built in the photoelectric conversion system or can be detachably attached to the photoelectric conversion system.

Further, the photoelectric conversion system includes an overall control/calculation unit 1009 and a timing generation unit 1008. The overall control/calculation unit 1009 controls various calculations and the entire digital still camera. The timing generation unit 1008 outputs various timing signals to the image capturing apparatus 1004 and the signal processing unit 1007. The timing signals can be input externally, and the photoelectric conversion system is to include at least the image capturing apparatus 1004 and the signal processing unit 1007 for processing output signals that are output from the image capturing apparatus 1004.

The image capturing apparatus 1004 outputs a captured image signal to the signal processing unit 1007. The signal processing unit 1007 performs predetermined signal processing on the captured image signal output from the image capturing apparatus 1004 and outputs image data. The signal processing unit 1007 generates an image using the captured image signal.

As described above, according to the present exemplary embodiment, it is possible to implement a photoelectric conversion system to which a photoelectric conversion apparatus (image capturing apparatus) according to one of the above-described exemplary embodiments is applied.

Figure 28A:
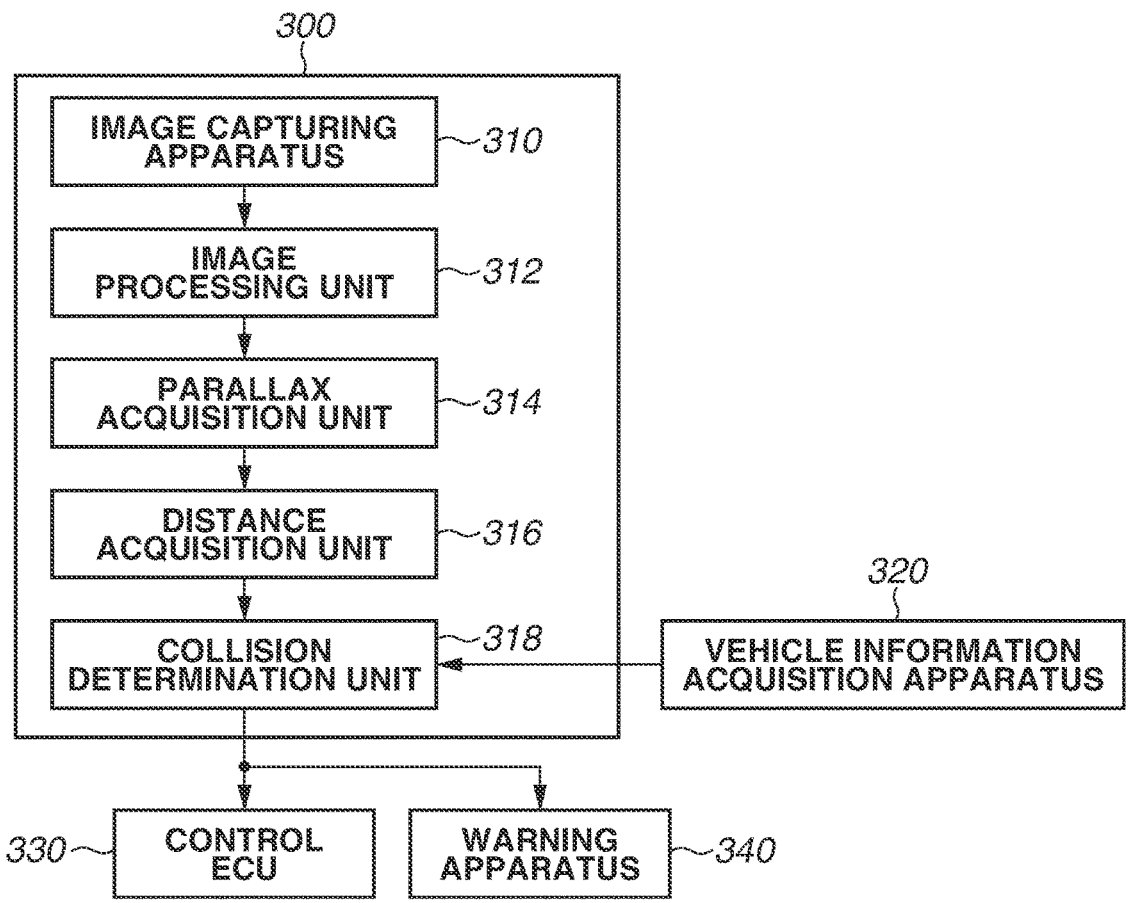
FIGS. 28A and 28B are diagrams illustrating a configuration and operations of a moving body according to a ninth exemplary embodiment.
Figure 28B:
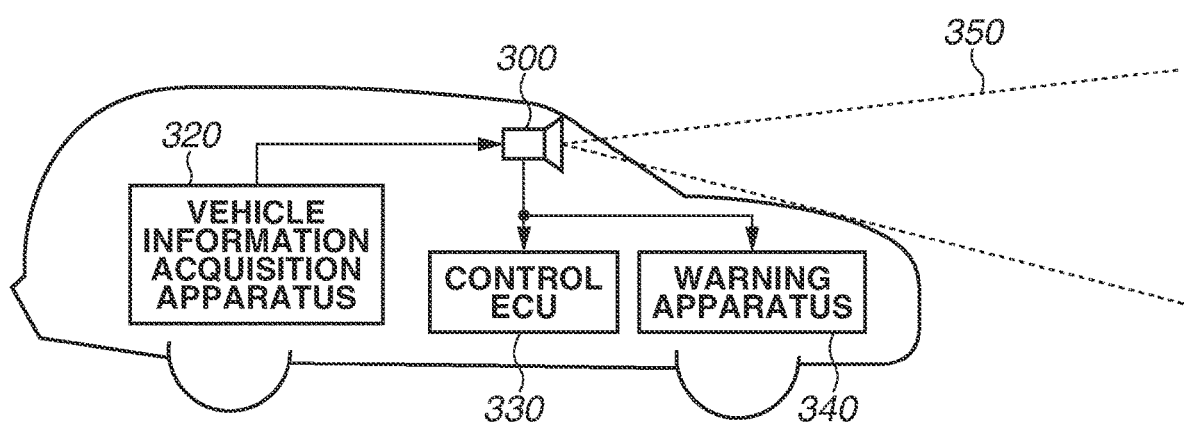

A photoelectric conversion system and a moving body according to a ninth exemplary embodiment will be described below with reference to FIGS. 28A and 28B. FIGS. 28A and 28B are diagrams illustrating a configuration of a photoelectric conversion system and a configuration of a moving body according to the present exemplary embodiment.

FIG. 28A illustrates an example of a photoelectric conversion system that relates to an in-vehicle camera. A photoelectric conversion system 300 includes an image capturing apparatus 310. The image capturing apparatus 310 is a photoelectric conversion apparatus (image capturing apparatus) according to one of the above-described exemplary embodiments. The photoelectric conversion system 300 further includes an image processing unit 312 and a parallax acquisition unit 314. The image processing unit 312 performs image processing on a plurality of pieces of image data obtained by the image capturing apparatus 310. The parallax acquisition unit 314 calculates a parallax (phase difference between parallax images) from a plurality of pieces of image data obtained by the photoelectric conversion system 300. Further, the photoelectric conversion system 300 further includes a distance acquisition unit 316 and a collision determination unit 318. The distance acquisition unit 316 calculates a distance to a target object based on the calculated parallax. The collision determination unit 318 determines a possibility of a collision based on the calculated distance. The parallax acquisition unit 314 and the distance acquisition unit 316 are an example of a distance information acquisition unit that obtains distance information about a distance to a target object. Specifically, the distance information is information about a parallax, a defocus amount, and a distance to a target object. The collision determination unit 318 can determine a possibility of a collision using one of the pieces of distance information. The distance information acquisition unit can be realized by dedicated hardware or by a software module. Further, the distance information acquisition unit can be realized by a field-programmable gate array (FPGA), an application-specific integrated circuit (ASIC), or a combination thereof.

The photoelectric conversion system 300 is connected to a vehicle information acquisition apparatus 320 and obtains vehicle information such as a vehicle speed, a yaw rate, and a rudder angle. Further, the photoelectric conversion system 300 is connected to a control engine control unit (control ECU) 330. The control ECU 330 is a control apparatus that outputs a control signal for generating a braking force for the vehicle based on a result of determination by the collision determination unit 318. Further, the photoelectric conversion system 300 is also connected to a warning apparatus 340. The warning apparatus 340 produces a warning to a driver based on a result of determination by the collision determination unit 318. For example, in a case where a result of determination by the collision determination unit 318 indicates a high possibility of a collision, the control ECU 330 controls the vehicle to avoid collisions or reduce damage by applying a brake, releasing an accelerator, and/or decreasing an engine output. The warning apparatus 340 warns the user by producing a warning such as a sound, displaying warning information on a screen of a car navigation system, and/or vibrating a seat belt and/or a steering.

According to the present exemplary embodiment, the photoelectric conversion system 300 captures images of regions around the vehicle, such as the front or rear of the vehicle. FIG. 28B illustrates a photoelectric conversion system that captures images of the front (image capturing range 350) of the vehicle. The vehicle information acquisition apparatus 320 transmits instructions to the photoelectric conversion system 300 or the image capturing apparatus 310. With the foregoing configuration, the accuracy of distance measurement increases.

While an example of the control for avoiding collisions with other vehicles is described above, the disclosure is also applicable to the control for automatically driving following another vehicle or the control for automatically driving within traffic lanes. Further, the photoelectric conversion system is applicable to not only a vehicle such as an automobile but also a moving body (moving apparatus) such as a ship, an airplane, or an industrial robot. Furthermore, the photoelectric conversion system is applicable to not only a moving body but also equipment that widely uses object recognition, such as Intelligent Transportation System (ITS).

Modified Exemplary Embodiments

The disclosure is not limited to the above-described exemplary embodiments, and various modifications can be made to the disclosure.

For example, an example in which a configuration of part of one exemplary embodiment is added to another exemplary embodiment and an example in which a configuration of part of one exemplary embodiment is replaced by a configuration of part of another exemplary embodiment are also included in the exemplary embodiments of the disclosure.

Further, the photoelectric conversion systems according to the eighth and ninth exemplary embodiments are examples of a photoelectric conversion system to which a photoelectric conversion apparatus is applicable, and photoelectric conversion systems to which a photoelectric conversion apparatus according to the disclosure is applicable are not limited to the configurations illustrated in FIGS. 27 and 28.

The above-described exemplary embodiments are merely examples embodying the disclosure, and the technical scope of the disclosure should not be interpreted narrowly by the exemplary embodiments. In other words, the disclosure can be implemented in various forms without departing from the technical concept or major feature of the disclosure.

Figure 29A:
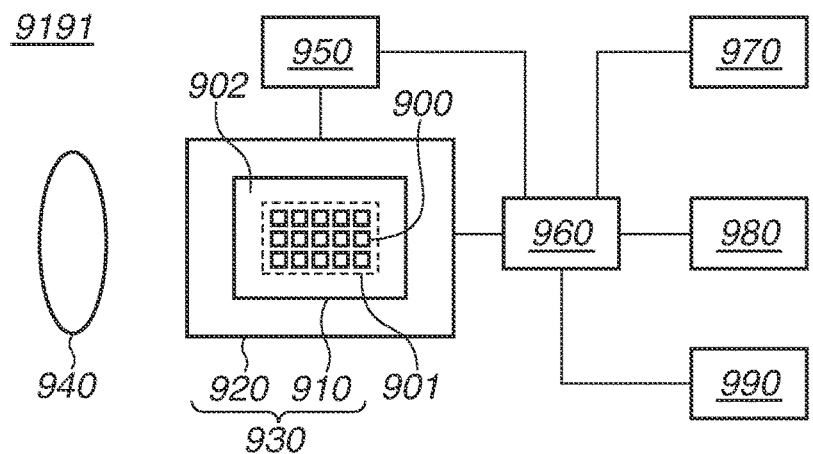
FIGS. 29A, 29B and 29C are diagrams illustrating a configuration of equipment according to a tenth exemplary embodiment.
Figure 29B:
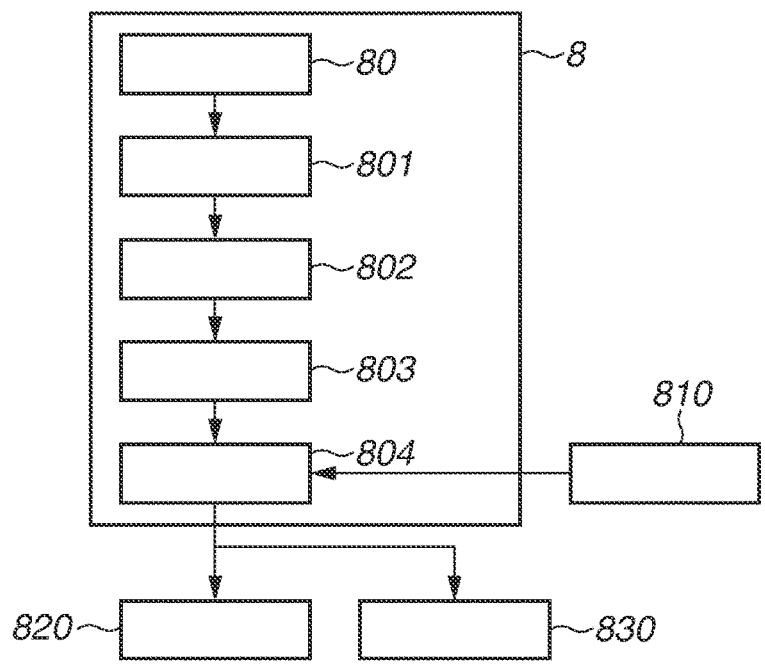
Figure 29C:
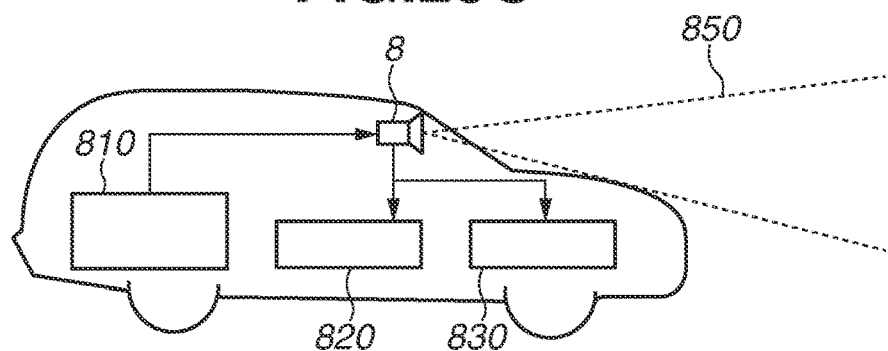

A tenth exemplary embodiment is applicable to any of the first to the seventh exemplary embodiments. FIG. 29A is a schematic view illustrating equipment 9191 including a photoelectric conversion apparatus 930 according to the present exemplary embodiment. The photoelectric conversion apparatus 930 is one of the photoelectric conversion apparatuses according to the first to the seventh exemplary embodiments or a photoelectric conversion apparatus according to a combination of the exemplary embodiments. The equipment 9191 including the photoelectric conversion apparatus 930 will be described in detail below. The photoelectric conversion apparatus 930 can include a semiconductor device 910 including a semiconductor layer as described above and a package 920 storing the semiconductor device 910. The package 920 can include a base substrate to which the semiconductor device 910 is fixed and a cover such as a glass facing the semiconductor device 910. The package 920 can further include bonding members such as bonding wires and bumps that connect terminals on the substrate and terminals on the semiconductor device 910 together.

The equipment 9191 can include at least one of an optical apparatus 940, a control apparatus 950, a processing apparatus 960, a display apparatus 970, a storage apparatus 980, and a mechanical apparatus 990. The optical apparatus 940 corresponds to the photoelectric conversion apparatus 930. The optical apparatus 940 is, for example, a lens, a shutter, and a mirror. The control apparatus 950 controls the photoelectric conversion apparatus 930. The control apparatus 950 is a photoelectric conversion apparatus such as an ASIC.

The processing apparatus 960 processes signals output from the photoelectric conversion apparatus 930. The processing apparatus 960 is a photoelectric conversion apparatus such as a CPU and an ASIC for forming an analog front end (AFE) or a digital front end (DFE). The display apparatus 970 is an electroluminescent (EL) display apparatus or a liquid crystal display apparatus that displays information (image) obtained by the photoelectric conversion apparatus 930. The storage apparatus 980 is a magnetic device or a semiconductor device that stores information (image) obtained by the photoelectric conversion apparatus 930. The storage apparatus 980 is a volatile memory such as a static random access memory (SRAM) or a dynamic random access memory (DRAM) or a non-volatile memory such as such as a flash memory or a hard disk drive.

The mechanical apparatus 990 includes a driving unit or a propulsion unit such as a motor or an engine. The equipment 9191 displays signals output from the photoelectric conversion apparatus 930 on the display apparatus 970 and/or externally transmits the signals via a communication apparatus (not illustrated) of the equipment 9191. Thus, the equipment 9191 includes the storage apparatus 980 and the processing apparatus 960 separately from a storage circuit and a calculation circuit of the photoelectric conversion apparatus 930. The mechanical apparatus 990 can be controlled based on signals output from the photoelectric conversion apparatus 930.

Further, the equipment 9191 is suitable for use in electronic equipment such as an information terminal (e.g., smartphone, wearable terminal) with an image capturing function or a camera (e.g., interchangeable lens camera, compact camera, video camera, surveillance camera). The mechanical apparatus 990 of a camera drives components of the optical apparatus 940 for zooming, focusing, and a shutter operation. Further, the mechanical apparatus 990 of a camera moves the photoelectric conversion apparatus 930 for an anti-vibration operation.

Further, the equipment 9191 can be transportation equipment such as a vehicle, a ship, or an airplane. The mechanical apparatus 990 of transportation equipment can be used as a moving apparatus. The equipment 9191 as transportation equipment is suitable for use in transporting the photoelectric conversion apparatus 930 or assisting in driving and/or automating driving (manipulating) using the image capturing function. The processing apparatus 960 for assisting in driving and/or automating driving (manipulating) can perform processing to operate the mechanical apparatus 990 as a moving apparatus based on information obtained by the photoelectric conversion apparatus 930. Further, the equipment 9191 can be medical equipment such as an endoscope, measurement equipment such as a distance measurement sensor, analysis equipment such as an electronic microscope, office equipment such as a copy machine, or industrial equipment such as a robot.

With the above-described exemplary embodiments, excellent pixel characteristics are obtained, thereby increasing the value of a photoelectric conversion apparatus. Increasing the value of a photoelectric conversion apparatus herein corresponds to at least one of adding a function, improving performance, improving a characteristic, improving reliability, improving a manufacturing yield, reducing environmental load, reducing cost, reducing size, and reducing weight.

Use of the photoelectric conversion apparatus 930 according to the present exemplary embodiment in the equipment 9191 improves the value of the equipment 9191. For example, use of the photoelectric conversion apparatus 930 in transportation equipment realizes excellent performance in capturing images outside the transportation equipment or in measuring an external environment. Thus, determining to use the photoelectric conversion apparatus according to the present exemplary embodiment in transportation equipment is beneficial in improving performance of the transportation equipment in manufacturing and selling the transportation equipment. Especially, the photoelectric conversion apparatus 930 is suitable for use in transportation equipment that assists in driving the transportation equipment and/or automatically drives the transportation equipment using information obtained by the photoelectric conversion apparatus 930.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-171692, filed Oct. 20, 2021, which is hereby incorporated by reference herein in its entirety.

What is claimed is:

1. An apparatus comprising:
a pixel unit including a plurality of pixels arranged in a plurality of rows, the plurality of pixels each including a quench element and a photodiode connected to the quench element, wherein a signal defining a start and an end of an exposure period is input to a control node of the quench element;
a scan unit configured to scan the pixel unit by performing reading processing of reading signals of the pixels, start processing of starting the exposure period, and end processing of ending the exposure period on the plurality of rows sequentially row by row in units of one row or two or more rows; and
a control unit configured to output a synchronization signal to the scan unit, the synchronization signal controlling a timing of the reading processing,
wherein at least one of a timing of the start processing and a timing of the end processing is controlled by another control signal different from the synchronization signal,
wherein the scan unit includes a plurality of row driving units arranged corresponding to the plurality of rows of the pixels, the plurality of row driving units each controlling the pixels of the corresponding row, and
wherein each of the plurality of row driving units includes:
a count unit configured to generate a count value by counting a pulse signal; and
an end control unit configured to generate the control signal based on the count value, the control signal controlling the end processing.

2. The apparatus according to claim 1, wherein the synchronization signal is a signal for controlling a timing to switch rows of the pixels on which the reading processing is to be performed.

3. The apparatus according to claim 1, wherein the synchronization signal is a signal for controlling a start of the scan by the scan unit.

4. The apparatus according to claim 1,
wherein the timing of the start processing is controlled by a first control signal that is the control signal, and
wherein the timing of the end processing is controlled by a second control signal that is the control signal.

5. The apparatus according to claim 1,
wherein each of the plurality of row driving units includes a start control unit configured to generate a start signal for controlling the start processing, and
wherein the count unit starts generating the count value based on a change in level of the start signal.

6. The apparatus according to claim 1,
wherein the control unit includes:
a signal generation unit configured to generate a plurality of clock signals different in cycle from each other; and
a selection generation unit configured to generate a selection signal for the plurality of row driving units, and
wherein one clock signal selected based on the selection signal from the plurality of clock signals is input to the count unit as the pulse signal for use in generating the count value.

7. The apparatus according to claim 6,
wherein the control unit includes a first count unit configured to generate a first count value by counting one of the plurality of clock signals and a second count unit configured to generate a second count value by counting another one of the plurality of clock signals,
wherein the control unit generates the control signal that the row driving units corresponding to part of the plurality of rows use in the end processing, using the first count value, and
wherein the control unit generates the control signal that the row driving units corresponding to another part of the plurality of rows use in the end processing, using the second count value.

8. The apparatus according to claim 1,
wherein the plurality of pixels is arranged in a plurality of columns,
wherein the control unit generates the control signal that the row driving units corresponding to part of the plurality of rows and corresponding to part of the plurality of columns use in the end processing, using the first count value, and
wherein the control unit generates the control signal that the row driving units corresponding to another part of the plurality of rows and corresponding to another part of the plurality of columns use in the end processing, using the second count value.

9. The apparatus according to claim 1, wherein the start processing is performed on the plurality of rows simultaneously.

10. The apparatus according to claim 9, wherein the start processing is controlled by the control signal.

11. The apparatus according to claim 9, wherein the end processing is performed on the plurality of rows simultaneously.

12. The apparatus according to claim 9, wherein the end processing is performed on the plurality of rows sequentially row by row based on the control signal.

13. A system comprising:
the apparatus according to claim 1; and
a signal processing unit configured to generate an image using a signal output from the apparatus.

14. A moving body comprising:
the apparatus according to claim 1; and
a control unit configured to control a movement of the moving body using a signal output from the apparatus.

15. An equipment comprising:
the apparatus according to claim 1; and
at least one of:
an optical apparatus corresponding to the apparatus;
a control apparatus configured to control the apparatus;
a processing apparatus configured to process a signal output from the apparatus;
a display apparatus configured to display information obtained by the apparatus;
a storage apparatus configured to store the information obtained by the apparatus; and
a mechanical apparatus configured to operate based on the information obtained by the apparatus.

16. An apparatus comprising:
a pixel unit including a plurality of pixels arranged in a plurality of rows, the plurality of pixels each including a quench element and a photodiode connected to the quench element, wherein a signal defining a start and an end of an exposure period is input to a control node of the quench element;
a scan unit configured to scan the pixel unit by performing reading processing of reading signals of the pixels, start processing of starting the exposure period, and end processing of ending the exposure period on the plurality of rows sequentially row by row in units of one row or two or more rows; and
a control unit configured to output a synchronization signal to the scan unit, the synchronization signal controlling a timing of the reading processing,
wherein at least one of a timing of the start processing and a timing of the end processing is controlled by a control signal different from the synchronization signal,
wherein the plurality of pixels is arranged in a plurality of columns,
wherein the apparatus includes a plurality of signal processing units arranged correspondingly to the plurality of columns and a second scan unit configured to perform a second scan to read the signals of the pixels sequentially from the plurality of signal processing units, and the signals of the pixels that are read from the pixels by the reading processing are input to the plurality of signal processing units, and
wherein the synchronization signal is a signal for controlling a cycle to start the second scan.

17. An apparatus comprising:
a pixel unit including a plurality of pixels arranged in a plurality of rows, the plurality of pixels each including a quench element and a photodiode connected to the quench element, wherein a signal defining a start and an end of an exposure period is input to a control node of the quench element;
a scan unit configured to scan the pixel unit by performing reading processing of reading signals of the pixels, start processing of starting the exposure period, and end processing of ending the exposure period on the plurality of rows sequentially row by row in units of one row or two or more rows; and
a control unit configured to output a synchronization signal to the scan unit, the synchronization signal controlling a timing of the reading processing,
wherein at least one of a timing of the start processing and a timing of the end processing is controlled by a control signal different from the synchronization signal, and
wherein the control unit includes:
a count unit configured to generate a count value by counting a pulse signal; and
a start trigger generation unit configured to generate the control signal based on the count value, the control signal controlling the start processing, and
wherein the start trigger generation unit outputs the control signal to the scan unit.

18. An apparatus comprising:
a pixel unit including a plurality of pixels arranged in a plurality of rows, the plurality of pixels each including a quench element and a photodiode connected to the quench element, wherein a signal defining a start and an end of an exposure period is input to a control node of the quench element;
a scan unit configured to scan the pixel unit by performing reading processing of reading signals of the pixels, start processing of starting the exposure period, and end processing of ending the exposure period on the plurality of rows sequentially row by row in units of one row or two or more rows; and
a control unit configured to output a synchronization signal to the scan unit, the synchronization signal controlling a timing of the reading processing,
wherein at least one of a timing of the start processing and a timing of the end processing is controlled by a control signal different from the synchronization signal, and wherein the control unit includes:
a count unit configured to generate a count value by counting a pulse signal; and
an end trigger generation unit configured to generate the control signal based on the count value, the control signal controlling the end processing, and
wherein the end trigger generation unit outputs the control signal to the scan unit.

19. The apparatus according to claim 17, wherein the synchronization signal and a clock signal that is the pulse signal are input to the count unit, and the count unit starts generating the count value based on a change in level of the synchronization signal.

* * * * *